US012597254B2

(12) United States Patent
Marlow et al.

(10) Patent No.: US 12,597,254 B2
(45) Date of Patent: Apr. 7, 2026

(54) TRACKING OPERATING ROOM PHASE FROM CAPTURED VIDEO OF THE OPERATING ROOM

(71) Applicant: Apella Technology Inc., Oakland, CA (US)

(72) Inventors: Cameron Alexander Marlow, Menlo Park, CA (US); David Michael Schummers, Oakland, CA (US); Jordan Stuart Tuttle, San Diego, CA (US)

(73) Assignee: Apella Technology Inc., Oakland, CA (US)

( * ) Notice: Subject to any disclaimer, the term of this patent is extended or adjusted under 35 U.S.C. 154(b) by 381 days.

(21) Appl. No.: 17/992,917

(22) Filed: Nov. 22, 2022

(65) Prior Publication Data

US 2024/0169734 A1    May 23, 2024

(51) Int. Cl.
| | |
|---|---|
| *G06V 20/52* | (2022.01) |
| *G06V 10/25* | (2022.01) |
| *G06V 10/764* | (2022.01) |
| *G06V 10/82* | (2022.01) |
| *G08B 13/196* | (2006.01) |
| *H04N 7/18* | (2006.01) |

(52) U.S. Cl.
CPC ............. *G06V 20/52* (2022.01); *H04N 7/181* (2013.01); *G08B 13/19608* (2013.01)

(58) Field of Classification Search
CPC ... G06V 20/52; H04N 7/181; G08B 13/19608
See application file for complete search history.

(56) References Cited

U.S. PATENT DOCUMENTS

| | | | | |
|---|---|---|---|---|
| 2020/0268457 | A1* | 8/2020 | Wolf ...................... | B25J 9/1661 |
| 2022/0399105 | A1* | 12/2022 | Wagner Block ....... | G16H 40/20 |
| 2023/0402164 | A1* | 12/2023 | Bhardwaj .............. | G16H 50/20 |
| 2023/0402166 | A1* | 12/2023 | Tiwary ................. | A61B 90/361 |
| 2024/0197438 | A1* | 6/2024 | Kebir ........................ | G01S 5/16 |

* cited by examiner

*Primary Examiner* — Oneal R Mistry
*Assistant Examiner* — Nhut Huy Pham
(74) *Attorney, Agent, or Firm* — Fenwick & West LLP

(57) ABSTRACT

Multiple image capture devices are located in an operating room to capture video of the entirety of the operating room. A surgical tracking server applies one or more models to the captured video to determine states of objects in the operating room. From the determined states, the surgical tracking system determines a phase of the operating room. The determined phase may indicate an availability of the operating room to perform surgery or a status of a surgery being performed in the operating room. An interface identifying the operating and the determined phase of the operating room is generated and displayed to one or more users. The interface may identify a length of time the operating room is in a phase, allowing a user to monitor availability and use of the operating room. Additionally, notifications about a phase of the operating room may be transmitted to users.

34 Claims, 8 Drawing Sheets

100

200

120

120

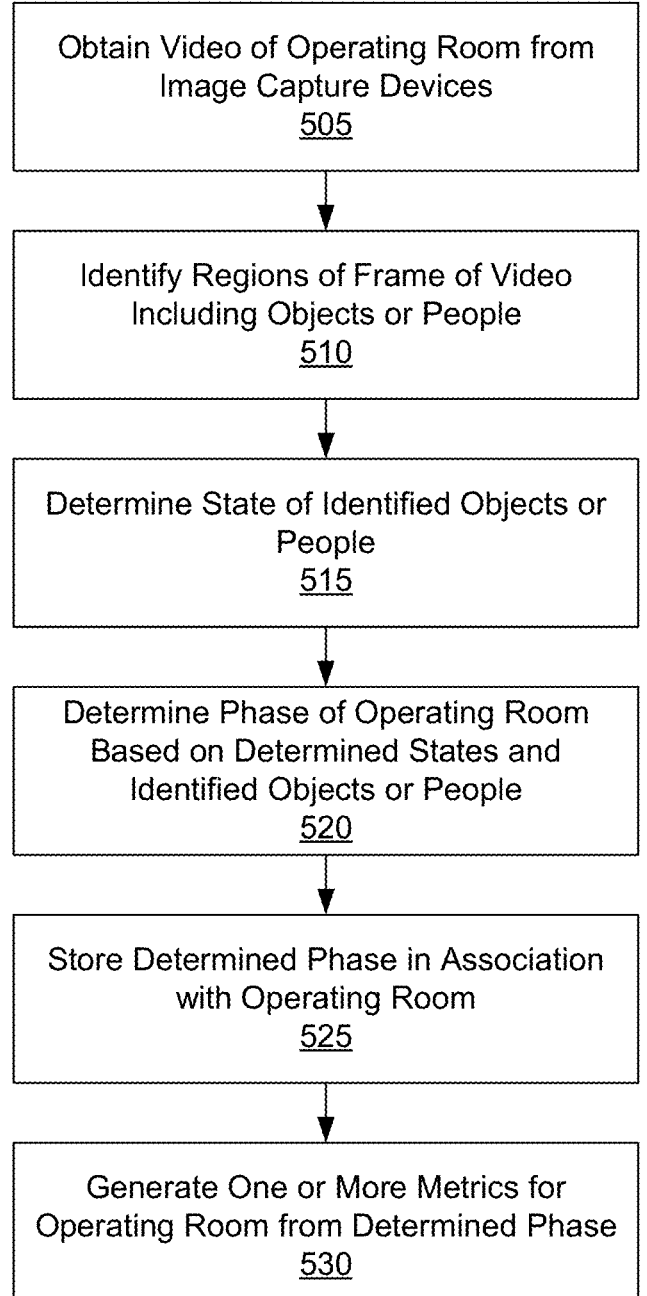

Obtain Video of Operating Room from
Image Capture Devices
505

Identify Regions of Frame of Video
Including Objects or People
510

Determine State of Identified Objects or
People
515

Determine Phase of Operating Room
Based on Determined States and
Identified Objects or People
520

Store Determined Phase in Association
with Operating Room
525

Generate One or More Metrics for
Operating Room from Determined Phase
530

FIG. 5

TRACKING OPERATING ROOM PHASE FROM CAPTURED VIDEO OF THE OPERATING ROOM

BACKGROUND

This invention relates generally to monitoring an operating room, and more specifically to determining a phase of the operating room from captured video of the operating room.

Hospitals or other medical facilities have a limited number of operating rooms for performing surgical procedures. In addition to having a limited number of operating rooms, conventional medical facilities or hospitals have limited information about usage of operating rooms, typically knowing whether an operating room is in use or is not in use. While this allows identification of when an operating room is being used, no information is available for estimating how when an operating room will be available for use. For example, conventional information about use of an operating room does not provide insight into a length of time before an operating room is cleaned after a surgical procedure or a length of time for an operating room to be prepared for a surgical procedures. This limited information about when an operating room is available makes it difficult for a medical facility to efficiently schedule surgical procedures, resulting in increased time between scheduling of surgical procedures.

Additionally, when a surgical procedure is performed in an operating room, personnel outside of the operating room are unable to determine a status the surgical procedure unless personnel inside the operating room specifically identify what is occurring in the operating room. This can be a distraction for personnel in the operating room when performing a surgical procedure and may be overlooked when a surgical procedure being performed. Relying on manual updating of progress of a surgical procedure from personnel in an operating room delays arrival of additional personnel for assisting with certain aspects of a surgical procedure, increasing a length of time an operating room is used for a surgical procedure.

SUMMARY

Multiple image capture device are positioned at different locations within an operating room so the combination of image capture devices captures video of an entirety of the operating room. Additionally, different image capture devices may be positioned within the operating room to provide overlapping views of certain locations within the operating room. For example, a plurality of image capture devices capture video of a surgical table in the operating room, another plurality of image capture devices capture video of an instrument table in the operating room, while one or more image capture devices capture video of a door to enter or to exit the operating room. In some embodiments, each image capture device captures independent video of a portion of the operating room, while in other embodiments, video captured from a set of image capture devices is combined by the surgical tracking server to generate a three-dimensional reconstruction of the operating room, or of a portion of the operating room. Each image capture device captures both video and audio of the operating room in various embodiments. The image capture devices are configured to communicate the captured video to a surgical tracking server.

In some embodiments, various other sensors are included in the operating room other types of sensors are included in the operating room and are configured to communicate with the surgical tracking server. For example, one or more audio capture devices or microphones are positioned within the operating room to capture audio within the operating room. As another example, one or more lidar sensors are positioned at locations within the operating room to determine distances between the lidar sensors and objects within the operating room. In another example, one or more wireless transceivers (e.g., BLUETOOTH®) are positioned within the operating room and exchange data with client devices within the operating room. From signal strengths detected by different wireless transceivers when communicating with a client device, the surgical tracking server determines a location of the client device within the operating room through triangulation or through any other suitable method. As another example, one or more radio frequency identification (RFID) readers are included in the operating room to identify objects in the operating room coupled to, or including, RFID tags and to communicate information identifying the objects to the surgical tracking server. One or more temperature sensors determine a temperature or a humidity of the operating room and transmit the determined temperature or pressure to the surgical tracking server. However, in various embodiments, any type or combination of types of sensors are included in the operating room and configured to communicate with the surgical tracking server, providing various types of data describing conditions inside the operating room to the surgical tracking server.

The surgical tracking server identifies regions within frames of video from one or more image capture devices including people or including other objects. In various embodiments, the surgical tracking server applies one or more models to the captured video data to identify the one or more regions within frames of video including objects, which include people, instruments, and equipment. Additionally, the surgical tracking server determines a state of one or more of the identified objects within the video by applying one or more trained models to the video and the identified objects. Example objects for which the surgical tracking server determines a state include: people in the operating room, tables in the operating room, surfaces in the operating room on which instruments are placed, cleaning equipment in the operating room, diagnostic equipment in the operating room, and any other suitable object included in the operating room. An example state of a person in the operating room indicates whether the person is scrubbed or unscrubbed; in another example, a state of a patient in the operating room indicates whether or not the patient is draped for surgery. An example state of a table in the operating room indicates whether the table is bare, is ready to be occupied by a patient, is occupied by a patient, or is unoccupied. An example state of an instrument surface indicates whether the instrument surface is prepared or is unprepared, while another example state of an instrument surface indicates whether the instrument surface is sterilized or is not sterilized. In various embodiments, surgical tracking server trains models to determine states of various objects identified in video based on states previously determined for an object or for a person from video, allowing the model to determine a state of an object or a person based on characteristics of video including the object or the person. For example, the surgical tracking server applies a label indicating a state of an object or a person to characteristics of video (or other data from sensors) including the object or the person. From the labeled characteristics, the surgical tracking server trains a model using any suitable training method or combination of training methods (e.g., back propagation to train the classification model if it is a neural network, curve fitting techniques if the classification model is a linear regression). The surgical tracking server applies the trained model, or trained models, to characteristics of frames of video data, or to other sensor data, to determine a state of the identified object.

From objects identified within video of the operating room from the image capture devices and states determined for the identified objects, the surgical tracking server determines a phase of the operating room that represents a state of objects within the operating room. The surgical tracking server maintains one or more sets of predefined phases for the operating room in various embodiments. For example, a set of predefined phases includes: a phase indicating the operating room is pre-operative, a phase indicating the operating room is in active surgery, a phase indicating the operating room is post-operative, a phase indicating the operating room is being cleaned, a phase indicating the operating room is idle, and a phase indicating the operating room is available. Different phases of the operating room may include one or more sub-phases to more particularly identify a status of objects within the operating room from captured video of the operating room, as well as data from one or more other types of sensors included in the operating room. For example, a phase indicating the operating room is pre-operative includes a set of sub-phases including a sub-phase indicating a patient is in the operating room, a sub-phase indicating the patient is on a surgical table, a sub-phase indicating the patient is receiving anesthesia, and a sub-phase indicating the patient is draped on the surgical table. In another example, a phase indicating the operating room is in active surgery includes a sub-phase indicating the patient has been opened for surgery, a sub-phase indicating surgical procedures are being performed on the patient, and a sub-phase indicating the patient has been closed. As another example, a phase indicating the operating room is post-operative includes a sub-phase indicating that the patient has been undraped, a sub-phase indicating the patient has woken from anesthesia, a sub-phase indicating the patient has been transferred from the surgical table to a gurney, and a sub-phase indicating the gurney is leaving the operating room. However, the surgical tracking server may maintain any suitable phases, with phases including any suitable number of sub-phases, in various embodiments.

To determine a phase from the obtained video, the surgical tracking server compares positions of identified objects and people in frames and the states determined for the identified objects and people of the obtained video to stored images corresponding to different phases. In various embodiments, the surgical tracking server applies one or more models that determine measures of similarity of frames of the obtained video data to stored images corresponding to phases by comparing positions of identified people and objects in frames of video data to positions of corresponding objects and people in images corresponding to phases and determines a phase of the operating room based on the measures of similarity. An image corresponding to a phase identifies locations within the image of one or more objects in the image and a state corresponding to each of at least a set of identified object. As an example, an image corresponding to a phase identifies locations of different people within the image and identifies whether different people within the image are scrubbed or unscrubbed. In an additional example, an image corresponding to a phase identifies locations of different surfaces within the image and identifies whether different surfaces are sterile or unsterilized. For example, the surgical tracking server determines a phase of the operating room corresponding to a frame of obtained as a phase for which the frame has a maximum measure of similarity.

In some embodiments, the surgical tracking server maintains a set of rules associating different phases for the operating room. Each rule includes criteria identifying different locations within frames of video of objects having specific states for a phase, so the surgical tracking server determines a phase of the operating room corresponding to a rule having a maximum number of criteria satisfied by a frame of the obtained video. Alternatively, the surgical tracking sever includes a trained phase classification model that receives as inputs states determined for various identified objects and locations of the identified objects within a frame of video and determines a similarity of the combination of identified objects and people and the locations within the frame of the identified objects and people to images corresponding to different phases. The surgical tracking server determines a phase of the operating room as a phase corresponding to an image for which the model determines a maximum similarity. The surgical tracking server may train the phase classification model to determine a likelihood of a combination of states of objects and their locations within a frame of video data matching a phase based on prior matching of combinations of states and locations of objects and people to phases. For example, the surgical tracking server applies a label indicating a phase to a combination of states of objects and locations of the objects in images. From the labeled combinations of states of objects and locations of the objects, the surgical tracking server trains the phase classification model using any suitable training method or combination of training methods (e.g., back propagation to train the classification model if it is a neural network, curve fitting techniques if the classification model is a linear regression). In some embodiments, the surgical tracking server trains different phase classification models corresponding to different phases, maintaining separate phase classification models for different phases. Using a similar sub-phase classification model or rules corresponding to different sub-phases, the surgical tracking server determines a sub-phase of the operating room from video of the operating room, or from data from other sensors within the operating room, when the phase determined for the operating room includes one or more sub-phases. Hence, the surgical tracking server determines both a phase and a sub-phase of the determined phase for the operating room when a phase includes one or more sub-phases.

When determining a phase or a sub-phase of the operating room from video of the operating room, the surgical tracking server may also determine a type of surgery for the operating room. To determine the type of surgery, the surgical tracking server applies one or more surgery classification models that determine measures of similarity of frames of the obtained video data to stored images or videos corresponding to different types of surgery comparing positions of identified people and objects in frames and identified instruments within video to positions of corresponding objects, people, and instruments in images or video corresponding to different types of surgery and determines a type of surgery performed in the operating room based on the measures of similarity. An image or video corresponding to type of surgery identifies locations within the image or within a frame of one or more objects, as well as instruments or positions of instruments, within in the image and a state corresponding to each of at least a set of objects, people, and instruments. As an example, an image or a video corresponding to a type of surgery identifies locations of different people within the image or video, locations of different instruments within the image or video, types of instruments within the image or video. For example, the surgical tracking server determines a type of surgery performed in the operating room corresponding to an image or video of a type of surgery for which the image or video has a maximum measure of similarity. The surgical tracking server may train the surgery classification model to determine a likelihood of video corresponding to a type of surgery based on prior selection of a type of surgery from locations of objects, people, and instruments to the type of surgery. For example, the surgical tracking server 120 applies a label indicating a type of surgery to a combination of people, objects, and instruments in images or video. From the labeled images or video, the surgical tracking server trains the surgery classification model using any suitable training method or combination of training methods (e.g., back propagation to train the classification model if it is a neural network, curve fitting techniques if the classification model is a linear regression). In some embodiments, the surgical tracking server trains different surgery classification models corresponding to different types of surgery, maintaining separate surgery classification models for different types of surgeries. In some embodiments, the surgical tracking server maintains a set of rules associating different types of surgery with the operating room. Each rule includes criteria identifying different locations within frames of video of objects, people, or instruments for a type of surgery, so the surgical tracking server 120 determines a type of surgery performed in the operating room corresponding to a rule having a maximum number of criteria satisfied by the obtained video. In some embodiments, the surgical tracking server 120 determines 520 a phase of the operating room, a sub-phase of the operating room, and a type of surgery for the operating room.

In some embodiments, based on video from an image capture device having a field of view including a door into the operating room, the surgical tracking server determines a number of times the door has opened. In some embodiments, the surgical tracking server identifies the door to the operating room has opened from changes in a position of the door in adjacent frames of video including the door. The surgical tracking sever may apply a trained model to frames of video including the door to determine when the door has been opened in some embodiments. In some embodiments, the surgical tracking server determines a number of times the door has opened in different phases of the operating room, allowing the surgical tracking server to maintain a record of a number of times the door has been opened when the operating room is in different phases. The surgical tracking sever may also track a number of people who enter and who exit the operating room based on video from the image capture device with a field of view including the door to the operating room. In some embodiments, the surgical tracking server also identifies people who enter and who exit the operating room through facial recognition methods, pose detection methods, or through any other suitable methods, and stores information identifying a person in conjunction with a time when the person entered or exited the operating room. Additionally, the surgical tracking sever also identifies a role of a person entering or exiting the operating room based on movement of the person within the operating room or characteristics of the person when entering or exiting the operating room (e.g., whether the person was holding an instrument, an instrument the person was holding, a color of the person's clothing, etc.) and stores the identified role in conjunction with the information identifying the person.

The surgical tracking server stores the determined phase in association with the operating room identifier and with a time when the phase was determined. From the determined phase, the surgical tracking server, or the analytics sever coupled to the surgical tracking server, generates one or more metrics describing the operating room. For example, a metric determines an amount of time the operating room has been in the determined phase based on prior determinations of the phase of the operating room and time when the prior determinations of the phase of the operating room were performed. The surgical tracking server or the analytics server generates an interface identifying lengths of time that the operating room has been determined to be in different phases in various embodiments. The interface may display information identifying different operating rooms and lengths of time each of the different operating rooms have been in different phases in some embodiments.

Additionally, the analytics server generates notifications for transmission to client devices via the network and instructions for a client device to generate an interface describing metrics or other analytic information generated by the analytics server. For example, the analytics server transmits a notification to client devices corresponding to one or more specific users when an operating room has a specific phase or has been in a specific phase for at least a threshold amount of time. This allows the analytics server to push a notification to specific users to provide the specific users with information about an operating room.

BRIEF DESCRIPTION OF THE DRAWINGS

FIG. 5 is a flowchart of a method for determining a phase of an operating room from video captured of the operating room, in accordance with an embodiment.

The FIGURES depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
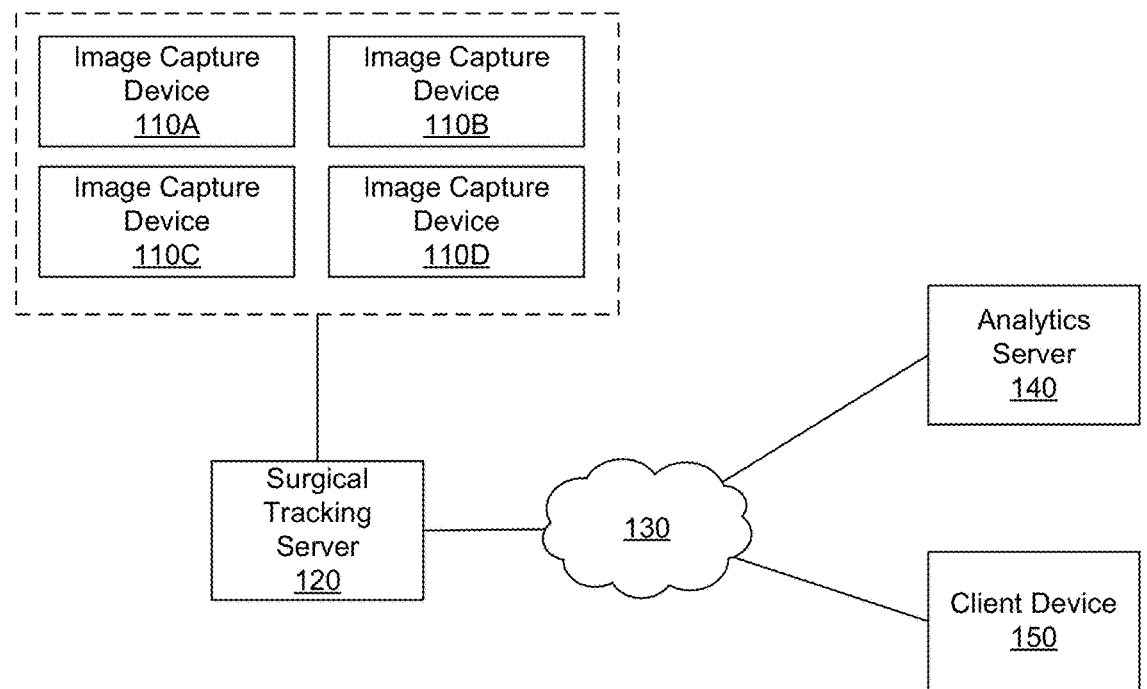
FIG. 1 is a block diagram of a system environment in which a surgical tracking server operates, in accordance with an embodiment.

FIG. 1 is a block diagram of one embodiment of a system environment 100 in which a surgical tracking server 120 operates, in accordance with an embodiment. The system environment 100 shown by FIG. 1 includes multiple image capture devices 110A, 110B, 110C, 110D (also referred to individually and collectively using reference number "110"), the surgical tracking server 120, a network 130, an analytics server 140, and a client device 150. In alternative configurations, different and/or additional components may be included in the system environment 100. Further, in some embodiments, functionality of certain components further described below may be combined into a single component.

Each image capture device 110 is configured to capture video (or images) of an area within a field of view of a corresponding image capture device 110. Multiple image capture devices 110A, 110B, 110C, 110D are positioned at different locations within an operating room so the combination of image capture devices 110A, 110B, 110C, 110D captures video of an entirety of the operating room. Additionally, different image capture devices 110A, 110B, 110C, 110D may be positioned within the operating room to provide overlapping views of certain locations within the operating room, such as a surgical table in the operating room. In some embodiments, each image capture device 110 captures independent video of a portion of the operating room. In other embodiments, the surgical tracking server 120 combines video captured from a set of image capture devices 110 to generate a three-dimensional reconstruction of the operating room, or of a portion of the operating room. Each image capture device 110 captures both video and audio of the operating room in various embodiments; for example, each image capture device 110 captures video and audio of the operating room using a real time streaming protocol (RTSP). Different image capture devices 110 may have fixed positions or may be configured to move within the operating room. Additionally, image capture devices 110 are capable of panning or zooming to alter video captured by the image capture devices 110.

Each image capture device 110 is configured to communicate with the surgical tracking server 120 to communicate video (and audio) captured by an image capture device 110 to the surgical tracking server 120. The image capture devices 110 are coupled to the surgical tracking server 120 through any suitable wireless or wired connection or combination of wireless or wired connections. In various embodiments, the surgical tracking server 120 is in a physical location common to the image capture devices 110. For example, the image capture devices 110 and the surgical tracking server 120 are in a common building or structure. In other examples, the surgical tracking server 120 is in a remote location from the image capture devices 110.

As further described below in conjunction with FIG. 3, the surgical tracking server 120 receives video from various image capture devices 110 and applies one or more computer vision methods to the video to identify regions of interest within the video, identify objects within the video, identify people or faces within the video. Additionally, from objects identified in the video and changes in positions of objects identified in the video, the surgical tracking server 120 determines a phase for the operating room. The phase for the operating room represents a state of objects within the operating room. For example, a phase indicates whether the operating room is in a pre-operative phase, an active surgical phase, a post-operative phase, a cleaning phase, or an available phase. Phases of the operating room and determination of a phase of the operating room from objects identified from the video is further described below in conjunction with FIG. 3. This allows the surgical tracking server 120 to leverage information from the captured video to determine a state of the operating room.

The network 130 may comprise any combination of local area and/or wide area networks, using both wired and/or wireless communication systems. In one embodiment, the network 130 uses standard communications technologies and/or protocols. For example, the network 130 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 130 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 130 may be represented using any suitable format, such as hypertext markup language (HTML) or extensible markup language (XML). In some embodiments, all or some of the communication links of the network 130 may be encrypted using any suitable technique or techniques.

The analytics server 140 is coupled to the surgical tracking server 120 via the network 130 in various embodiments. In other embodiments, the analytics server 140 is coupled to the surgical tracking server 120 through any suitable connection. In various embodiments, the analytics server 140 receives a phase of the operating room determined by the surgical tracking server 120. In some embodiments, the analytics server 120 also receives video captured by the image capture devices 110. From the phase of the operating room and information received from the surgical tracking server 120 in conjunction with the phase of the operating room, the analytics server 140 generates one or more analytics for the operating room. For example, the analytics server 140 receives a phase of the operating room and a timestamp indicating when the phase was determined from the surgical tracking server 120 and determines an amount of time that the operating room has been determined to be in the phase. In various embodiments, the analytics server 140 also generates one or more metrics for the operating room based on the amount of time the operating room has been determined to be in the phase. In various embodiments, the analytics server 140 receives a phase determined for an operating room, an identifier of the operating room, and a time when the phase was determined from the surgical tracking server 120, allowing the analytics server 140 to generate and to maintain phases for multiple operating rooms. Generation of analytics for the operating room is further described below in conjunction with FIG. 4.

Additionally, the analytics server 140 generates notifications for transmission to client devices 150 via the network 130 and instructions for a client device 150 to generate an interface describing metrics or other analytic information generated by the analytics server 140. For example, the analytics server 140 transmits a notification to client devices 150 corresponding to one or more specific users when an operating room has a specific phase or has been in a specific phase for at least a threshold amount of time. This allows the analytics server 140 to push a notification to specific users to provide the specific users with information about an operating room. Similarly, instructions generated by the analytics sever 140 and transmitted to a client device 150 cause the client device 150 to generate an interface describing metrics or analytic information generated by the analytics sever 140 for one or more operating rooms. A user of the client device 150 may select one or more interfaces from the analytics server 140 to receive instructions for generating a specific interface displaying one or more metrics or other analytic information for one or more operating rooms generated by the analytics server 140. Interfaces or notifications generated by the analytics server 140 are further described below in conjunction with FIG. 4.

A client device 150 is one or more computing devices capable of receiving user input as well as transmitting and/or receiving data via the network 130. In one embodiment, the client device 150 is a conventional computer system, such as a desktop computer or a laptop computer. Alternatively, the client device 150 may be a device having computer functionality, such as a personal digital assistant (PDA), a mobile telephone, a smartphone or another suitable device. A client device 150 is configured to communicate with other devices via the network 130. In one embodiment, the client device 150 executes an application allowing a user of the client device 150 to interact with the analytics server 140 or with the surgical tracking server 120. For example, the client device 150 executes a browser application to enable interaction with the analytics sever 140 or with the surgical tracking server 120 via the network 130. In another embodiment, a client device 150 interacts with the analytics server 140 or with the surgical tracking server 120 through an application programming interface (API) running on a native operating system of the client device 150, such as IOS® or ANDROID™.

Figure 2:
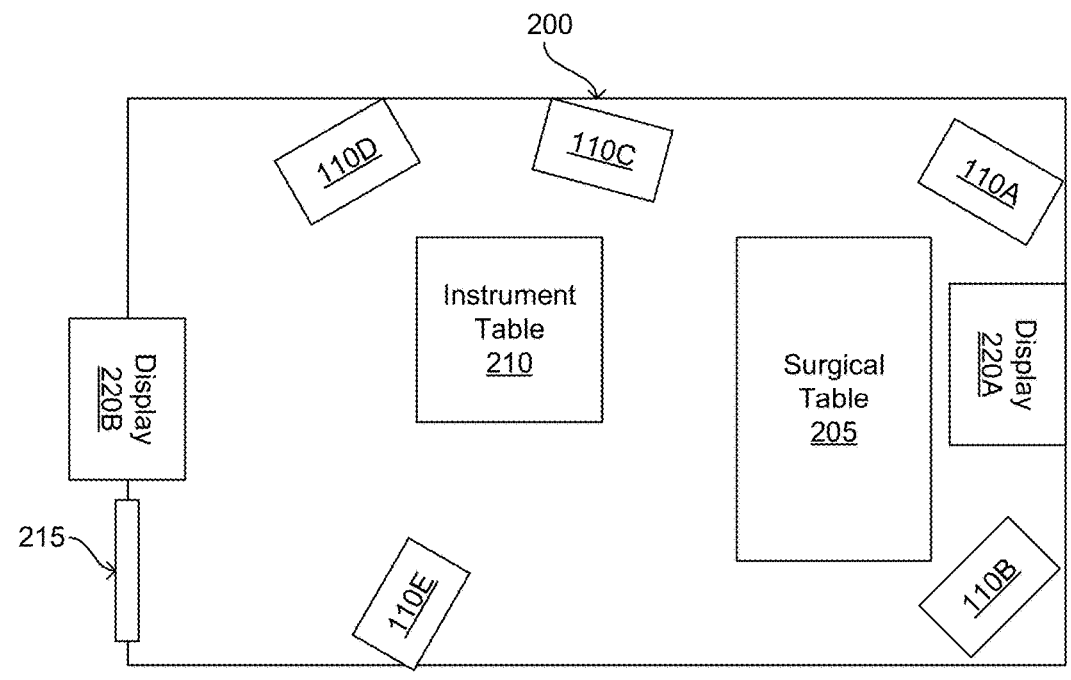
FIG. 2 is an example configuration of image capture devices in an operating room for capturing video transmitted to a surgical tracking server, in accordance with an embodiment.

FIG. 2 is an example configuration of image capture devices 110 in an operating room 200 for capturing video transmitted to a surgical tracking server 120. In the example of FIG. 2, the operating room 200 includes a surgical table 205, an instrument table 210, and a door 215, although additional equipment is included in the operating room 200 in different configurations or implementations. Further, while the example shown in FIG. 2 shows five image capture devices 110A, 110B, 100C, 110D, 110E (also referred to individually and collectively using reference number 110), in other embodiments any suitable number of image capture devices 110 are included in the operating room 200.

The image capture devices 110A, 110B, 110C, 110D, 110E are placed at different locations within the operating room 200 so a combination of video captured by image capture devices 110A, 110B, 110C, 110D, 110E includes an entire area within the operating room 200. Additionally, different image capture devices 110A, 110B, 110C, 110D, 110E are positioned so specific objects within the operating room 200 are within a field of view of particular image capture devices 110A, 110B, 110C, 110D, 110E. In the example of FIG. 2, image capture devices 110A and 110B are positioned so the surgical table 205 is within a field of view of both image capture device 110A and image capture device 110B. At least a portion of a field of view of image capture device 110A overlaps with at least a portion of a field of view of image capture device 110B in some embodiments, providing overlapping fields of view of the surgical table 205 from different image capture devices 110A, 110B. In some embodiments, image capture device 110A, image capture device 110B, or an additional image capture device 110 is located in or coupled to a surgical light proximate to the surgical table 205 and configured to illuminate a portion of a surgical area on the surgical table 205, allowing an image capture device 110 to capture video of the surgical area. Similarly, image capture devices 110C, 110D are positioned so fields of view of both image capture device 110C and image capture device 110D include the instrument table 210. In some embodiments, at least a portion of a field of view of image capture device 110C overlaps with at least a portion of a field of view of image capture device 110D, providing overlapping fields of view of the instrument table 210. Further, one or more image capture devices 110 may be coupled to or included in one or more surgical instruments, such as a laparoscope, and configured to communicate video to the surgical tracking server 120. In various embodiments, the image capture devices 110 are positioned below a level of light fixtures in the operating room 200 to improve illumination of video captured by the image capture devices 110.

Additionally, in the example shown by FIG. 2, image capture device 110E is positioned within the operating room 200 so a field of view of image capture device 110E includes a door 215 providing ingress and egress to the operating room 200. Image capture device 110E has a field of view capable of capturing people entering and exiting the operating room 200 through the door 215 and capturing opening and closing of the door 215. While FIG. 2 shows an example with a single image capture device 110E capturing video of the door 215, in other embodiments, multiple image capture devices 110 are positioned to have fields of view including the door 215. Additionally, in environments where the operating room 200 includes multiple points of entry or exit, image capture devices 110 are positioned so various image capture devices 110 include fields of view including the multiple points of entry or exit. For example, each point of entry or exit is within a field of view of at least one image capture device 110 in various embodiments.

In the example shown by FIG. 2, the operating room 200 also includes displays 220A, 220B. Each display 220A, 220B is communicatively coupled to the surgical tracking server 120 or to the analytics server 140. A display 220A, 220B receives a notification or instructions from the surgical tracking server 120 or the analytics server 140 and displays information based on the received notification or instructions. For example, display 220B is positioned proximate to the door 215 and is visible from outside of the operating room 200. In response to receiving a specific instruction from the surgical tracking server 120 or the analytics server 140, display 220B displays a message not to open the door 215 to prevent people outside of the operating room 200 from opening the door. As another example, display 220A is visible from the surgical table and displays a timer in response to information from the surgical tracking server 120 or the analytics server 140, with the timer indicating an amount of time that the operating room 200 has been in a phase determined by the surgical tracking server. Other information, such as messages to people inside the operating room 200, instructions for operating equipment in the operating room 200, or any other suitable information may be displayed by display 220A, 220B based on instructions or notifications received from the surgical tracking server 120 or the analytics server 140.

While FIG. 2 shows an example where the operating room 200 includes multiple image capture devices 110, in various embodiments, other types of sensors are included in the operating room 200 and configured to communicate with the surgical tracking server 120. For example, one or more audio capture devices or microphones are positioned within the operating room 200 to capture audio within the operating room 200. As another example, one or more lidar sensors are positioned at locations within the operating room to determine distances between the lidar sensors and objects within the operating room. In another example, one or more wireless transceivers (e.g., BLUETOOTH®) are positioned within the operating room 200 and exchange data with client devices 150 within the operating room 200; from signal strengths detected by different wireless transceivers when communicating with a client device 150, the surgical tracking server 120 determines a location of the client device 150 within the operating room 200 through triangulation or through any other suitable method. As another example, one or more radio frequency identification (RFID) readers are included in the operating room 200 to identify objects in the operating room coupled to, or including, RFID tags and to communicate information identifying the objects to the surgical tracking server 120. One or more temperature sensors determine a temperature or a humidity of the operating room 200 and transmit the determined temperature or pressure to the surgical tracking server 120. However, in various embodiments, any type or combination of types of sensors are included in the operating room 200 and configured to communicate with the surgical tracking server 120, providing various types of data describing conditions inside the operating room 200 to the surgical tracking server 120.

Figure 3:
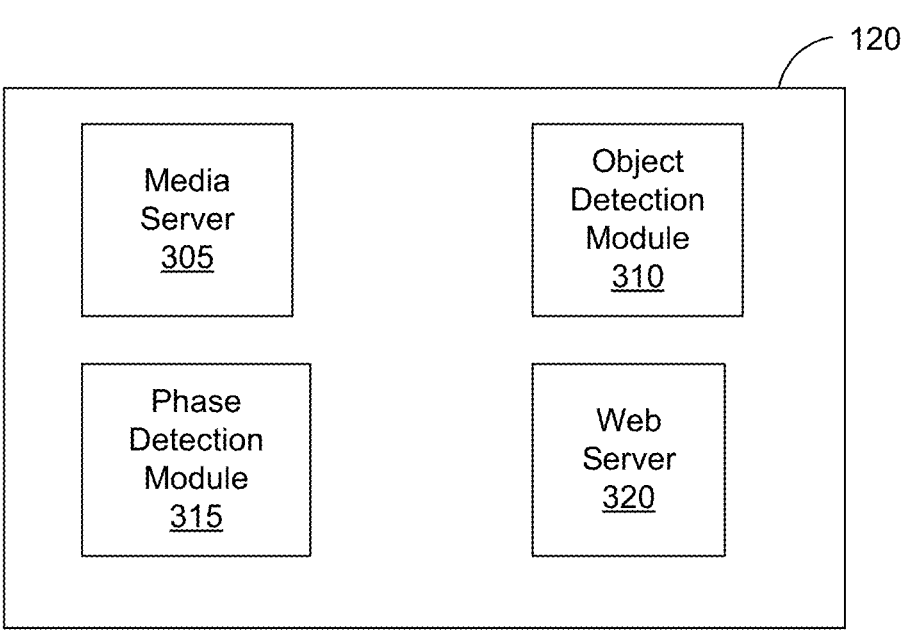
FIG. 3 is a block diagram of a surgical tracking server, in accordance with an embodiment.

FIG. 3 is a block diagram of a surgical tracking server 120, in accordance with an embodiment. The surgical tracking server 120 shown in FIG. 3 includes a media server 305, an object detection module 310, a phase detection module 310, and a web server 320. In other embodiments, the surgical tracking server 120 may include additional, fewer, or different components for various applications. Conventional components such as network interfaces, security functions, load balancers, failover servers, management and network operations consoles, and the like are not shown so as to not obscure the details of the system architecture.

The media server 305 receives video captured by the one or more video capture devices 110. When an operating room includes additional types of sensors, the media server 305 also receives data from other sensors included in the operating room. In various embodiments, the media server 305 establishes a connection to one or more video capture devices 110 using real time streaming protocol (RTSP). The media server 305 also transmits instructions to the one or more video capture devices 110 in some embodiments, such as instructions to reposition a field of view of an image capture device 110 or instructions to change a magnification level of an image capture device. Additionally, the media sever 205 may transmit instructions to other sensors in an operating room that are coupled to the surgical tracking server 120, allowing the media server to adjust operation of various sensors in the operating room through any suitable protocols or formats.

The object detection module 310 applies one or more models to the captured video data to identify one or more regions within frames of video from the one or more image capture devices 110 that include objects, including people, instruments, equipment, or other objects. For example, the one or more models perform two- or three-dimensional pose tracking, allowing the object detection module 310 to identify regions of video data including an object based on the pose tracking. In various embodiments, the object detection module 310 performs facial tracking (in two-dimensions or in three-dimensions), two-dimensional pose tracking, three-dimensional pose tracking, or any other suitable method to identify portions of a person's face or portions of the person's body within video from one or more image capture devices 110. The object detection module 310 identifies regions of video including objects and stores metadata in association with the video data specifying locations within the video of the identified regions. For example, the object detection module 310 stores coordinates of frames of the video specifying a bounding box identified as including an object, so the bounding box specifies the region of the video including the object.

Additionally, the object detection module 310 applies one or more object detection methods to video data from one or more image capture devices 310 to identify objects in frame of the video. The object detection module 310 also identifies locations of identified objects in frames of video in various embodiments. For example, the object detection module 310 generates a bounding box surrounding each object identified in a frame. In various embodiments, the object detection module 310 uses one or more object detection methods to identify objects within frames of video data and to generate bounding boxes corresponding to each of the identified objects. When identifying objects, the object detection module 310 may also identify a category or a type for each identified object. For example, an object detection method applied by the object detection module 310 associates different categories with objects based on characteristics of the objects and associates a type or a category from the object detection method with an identified object.

In some embodiments, the object detection module 310 compares each object identified with frames of video to stored images of equipment or items included in an operating room. The object detection module 310 maintains a library of images corresponding to different equipment or items provided by one or more users or obtained from any suitable source. When comparing an object identified within previously obtained images of items or equipment, the object detection module 310 determines confidences of the identified object matching different items or equipment by applying a classification model to the identified object and to the images of equipment or items. The object detection module 310 may train the classification model to determine a likelihood of an object identified from a frame of video matching an item or equipment based on prior matching of objects in video to different items or equipment. For example, the object detection module 310 applies a label indicating an item or equipment matching an object identified from video to characteristics of the object identified from the video. From the labeled characteristics of objects extracted from video the object detection module 310 trains the classification model using any suitable training method or combination of training methods (e.g., back propagation to train the classification model if it is a neural network, curve fitting techniques if the classification model is a linear regression). After training, the object detection module 310 applies the trained classification model to characteristics of objects identified within video, and the classification model outputs confidences of the object matching different items or equipment. Based on the confidences output by the classification model, the object detection module 310 determines an item or equipment corresponding to an identified object. For example, the object detection module 310 determines an identified object is an item or equipment for which the classification model output a maximum confidence.

From objects detected by the object detection module 310 within video of the operating room from the image capture devices 110, the phase detection module 315 determines a phase of the operating room. The phase for the operating room represents a state of objects within the operating room. For example, a phase indicates whether the operating room is in a pre-operative phase, an active surgical phase, a post-operative phase, a cleaning phase, or an available phase. Different phases of the operating room may include one or more sub-phases identified by the phase detection module 315 to more particularly identify a status of objects within the operating room from captured video of the operating room, as well as data from one or more other types of sensors included in the operating room.

In some embodiments, the phase detection module 315 receives video and an identifier of objects included in the video data from the object detection module 310. The phase detection module 315 determines a state of one or more of the identified objects within the video by applying one or more trained models to the video and the identified objects. Example objects for which the phase detection module 315 determines a state include: people in the operating room, tables in the operating room, surfaces in the operating room on which instruments are placed, cleaning equipment in the operating room, diagnostic equipment in the operating room, and any other suitable object included in the operating room. An example state of a person in the operating room indicates whether the person is scrubbed or unscrubbed; in another example, a state of a patient in the operating room indicates whether or not the patient is draped for surgery. An example state of a table in the operating room indicates whether the table is bare, is ready to be occupied by a patient, is occupied by a patient, or is unoccupied. An example state of an instrument surface indicates whether the instrument surface is prepared or is unprepared, while another example state of an instrument surface indicates whether the instrument surface is sterilized or is not sterilized. In various embodiments, the phase detection module 315 trains models to determine states of various objects identified in video by the object detection module 310 based on states previously determined for an object or for a person from video, allowing the model to determine a state of an object or a person based on characteristics of video including the object or the person. For example, the object detection module 310 applies a label indicating a state of an object or a person to characteristics of video (or other data from sensors) including the object or the person. From the labeled characteristics, the phase detection module 315 trains a model using any suitable training method or combination of training methods (e.g., back propagation to train the classification model if it is a neural network, curve fitting techniques if the classification model is a linear regression). After training, the phase detection module 315 applies the trained model to characteristics of video (or to other sensor data) including an identified object to output a state of the identified object.

From the states determined for various identified objects, the phase detection module 315 determines a phase for the operating room. In some embodiments, the phase detection module 315 maintains a set of rules associating different phases for the operating room with different combinations of states determined for objects in the operating room. Alternatively, the phase detection module 315 includes a trained phase classification model that receives, as inputs, states determined for various identified objects and outputs a phase for the operating room from the determined states. The phase detection module 315 may train the phase classification model to determine a likelihood of a combination of states of objects matching a phase based on prior matching of combinations of states to phases. For example, the phase detection module 315 applies a label indicating a combination of states of objects matching a phase. From the labeled combinations of states of objects, phase detection module 315 trains the phase classification model using any suitable training method or combination of training methods (e.g., back propagation to train the classification model if it is a neural network, curve fitting techniques if the classification model is a linear regression).

As further described below in conjunction with FIG. 4, the phase of the operating room determined by the phase detection module 315 is transmitted to the analytics server 140, which determines additional information describing the operating room from the determined phase. For example, the phase detection module 315 communicates an identifier of an operating room, a phase determined for the operating room, and a time when the phase was determined for the operating room to the web server 320 for transmission to the analytics server 140. In other embodiments, the phase detection module 315 communicates any suitable information to the analytics server 140.

The web server 320 links the surgical tracking server 120 via the network 130 to the analytics server 140 or to one or more client devices 150. Additionally, the web server 320 may exchange information between the surgical tracking server 120 and the analytics server 140. The web server 320 serves web pages, as well as other content, such as JAVA®, FLASH®, XML, and so forth. The web server 320 may receive and route messages between the analytics server 140 or one or more client devices 150 and or to the surgical tracking server 120. A user may send a request to the web server 320 from a client device 150 for specific information maintained by the surgical tracking server 120. Additionally, the web server 320 may provide application programming interface (API) functionality to send data directly to native client device operating systems, such as IOS®, ANDROID™, WEBOS® or BlackberryOS.

Figure 4:
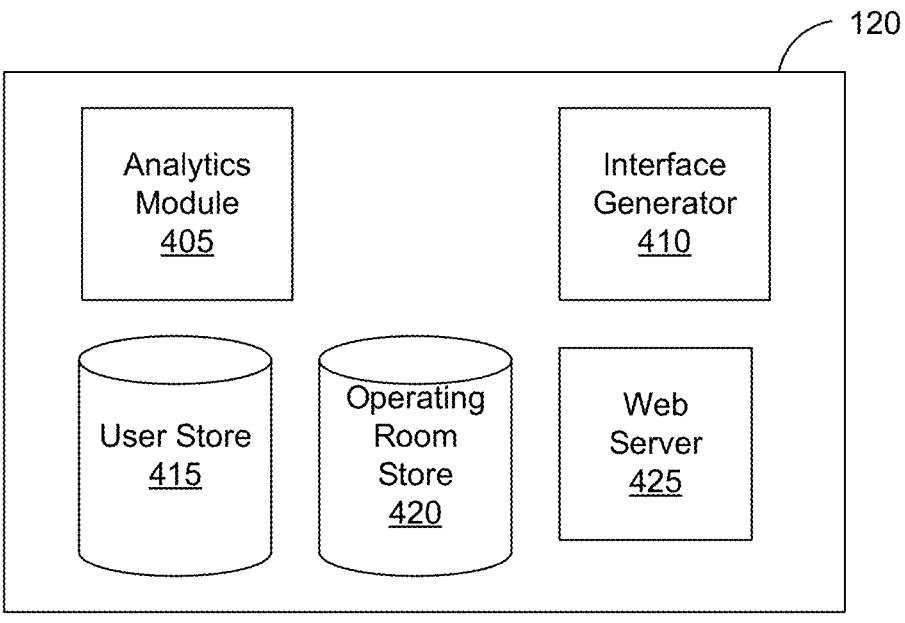
FIG. 4 is a block diagram of an analytics server, in accordance with an embodiment.

FIG. 4 is a block diagram of an analytics server 140, in accordance with an embodiment. The analytics server 140 shown in FIG. 4 includes an analytics module 405, an interface generator 410, a user store 415, an operating room store 420, and a web server 425. In other embodiments, the analytics sever 140 may include additional, fewer, or different components for various applications. Conventional components such as network interfaces, security functions, load balancers, failover servers, management and network operations consoles, and the like are not shown so as to not obscure the details of the system architecture. In some embodiments, the functionality described in conjunction with the analytics server 140 is also provided by the surgical tracking server 120, allowing a single device to provide the functionality of the analytics server 140 and the surgical tracking server 120.

The analytics module 405 receives information describing an operating room, including a phase of the operating room, from the surgical tracking server 120 and generates one or more metrics describing the operating room. For example, the analytics module 405 receives an identifier of an operating room, a phase determined for the operating room, and a time when the phase was determined for the operating room from the surgical tracking server 120. From the received information, the analytics module 405 determines a duration that the operating room has been in a particular phase. Similarly, the analytics module 405 identifies a time when the operating room changes from a phase to a different phase. In some embodiments, the analytics module 405 compares a determined duration that the operating room has been in a particular phase to a desired duration and generates a metrics based on the comparison. The metric indicates whether the operating room has been in the particular phase longer than the desired duration in some embodiments. The analytics module 405 maintains different desired durations for different phases in various embodiments and may maintain desired durations for different combinations of phases and operating room, allowing a generated metric to reflect characteristics of a particular operating room.

From analytical information or metrics determined by the analytics module 405, the interface generator 410 generates one or more notifications or instructions for a client device 150 to render an interface. In various embodiments, the interface generator 410 includes one or more criteria and generates a notification for transmission to a client device 150 of a user when metrics or analytical information generated by the analytics module 405 satisfy at least a threshold amount of criteria. Different criteria may be maintained for different operating rooms in various embodiments. For example, the interface generator 410 retrieves criteria from the operating room store 420 from an operating room identifier and compares metrics from the analytics module 405 to the retrieved criteria for the operating room. The criteria for an operating room includes information identifying a user to whom a notification is transmitted in various embodiments. In some embodiments, the surgical tracking server 120 or the analytics server 140 transmits a notification to a specific user in response to an amount of time the operating room has been in a determined phase equals or exceeds a threshold duration. In some embodiments, the threshold duration is defined based on a type of surgery determined for the operating room. As another example, the interface generator 410 includes instructions for rendering an interface displaying one or more metrics for an operating room. For example, an interface includes identifiers of different phases and displays a duration that an operating room has been determined to be in each of the different phases; the interface displays an indication whether the operating room has been in a determined phase for greater than a desired duration in some embodiments. However, the interface generator 410 includes instructions for generating any suitable interface to present metrics or other analytical data from the analytics module 405 to users or for transmitting notifications to client devices 150 of users when metrics or other analytical information from the analytics module satisfy one or more criteria.

The user store 415 includes a user profile for each user of the analytics server 140 or of the surgical tracking server 120. A user profile includes a user identifier uniquely identifying the user and may include any other information describing the user (e.g., a username, descriptive information of the user, etc.). Additionally, a user profile for a user identifies which operating rooms about which the user is authorized to obtain data from the surgical tracking server 120 or from the analytics server 140. In some embodiments, a user profile identifies a type of a user. Different types of users receive different information from the analytics server 140 or from the surgical tracking server 120. For example, a user having a type identified as a nurse receives notifications from the analytics server 140 when an operating room is in one or more particular phases. As another example, a user having a type identified as an administrator is authorized to retrieve interfaces displaying durations that various operating rooms have been in one or more phases. Hence, users having different types may be authorized to access different data from the analytics server 140 or from the surgical tracking server 120, allowing the analytics sever 140 or the surgical tracking server 120 to provide different users with access to different information.

Additionally, a user profile for a user may include one or more images identifying the user. In some embodiments, the surgical tracking server 120 retrieves images of users from user profiles and compares facial data or other user data from captured video to identify one or more users in the video. Other identifying information may be stored in a user profile for a user, allowing the surgical tracking server 120, or the analytics server 140, to identify users included in video data or other data captured by sensors included in the operating room. Users having a certain type, such as a type indicating a user is a surgeon, may store preference information in a corresponding user profile, with the preference information specifying one or more configurations in the operating room. For example, preference information for a surgeon identifies instruments to include on an instrument table for the surgeon and may specify a placement of instruments on the instrument table relative to each other. Identifying a particular user who is a surgeon from captured video or other data allows the surgical tracking server 120 to retrieve the preference information of the surgeon for use in preparing the operating room for the surgeon. Multiple sets of preference information may be maintained for a user, with different preference information corresponding to different types of surgeries, allowing a user to specify preferred instruments and instrument placement for a variety of surgeries.

The operating room store 420 includes an operating room profile for each operating room for which the surgical tracking server 120 obtains video (or other data). A profile for an operating room includes an operating room identifier that uniquely identifies the operating room. In association with an operating room identifier, the operating room profile includes metrics or other analytical data generated by the analytics module 405. In some embodiments, the operating room profile includes metrics or other analytical data generated within a threshold time interval of a current time. Additionally, the operating room profile for an operating room includes a schedule for the operating room that indicates dates and times when surgeries using the operating room are scheduled or when the operating room is otherwise in use. The schedule for an operating room is obtained from one or more users authorized to provide scheduling information for the operating room, such as users having one or more specific types. The schedule for an operating room identifies users or patients scheduled to be in the operating room during a time interval, as well as a description of a procedure or surgery to be performed during the time interval. This allows the operating room profile to provide information describing planned use of an operating room corresponding to the operating room profile. In other embodiments, additional information may be included in an operating room profile.

The web server 425 links the analytics server 140 via the network 130 to the surgical tracking server 120 or to one or more client devices 150. Additionally, the web server 425 may exchange information between the surgical tracking server 120 and one or more client devices 150. The web server 425 serves web pages, as well as other content, such as JAVA®, FLASH®, XML and so forth. The web server 425 may receive and route messages between the analytics server 140 or one or more client devices 150 or to the surgical tracking server 120. A user may send a request to the web server 425 from a client device 150 for specific information maintained by the analytics server 140. Similarly, the web server 425 may transmit a notification or instructions for generating an interface to a client device 150 to display or to otherwise present content from the analytics server 140 to a user via the client device 150. Additionally, the web server 425 may provide application programming interface (API) functionality to send data directly to native client device operating systems, such as IOS®, ANDROID™, WEBOS® or BlackberryOS.

Determining Operating Room Phase

FIG. 5 is a flowchart of one embodiment of a method for determining a phase of an operating room from video captured of the operating room. In other embodiments, the method includes different or additional steps than those described in conjunction with FIG. 5. Further, in some embodiments, steps of the method are performed in different orders than the order described in conjunction with FIG. 5.

A surgical tracking server 120, further described above in conjunction with FIGS. 1 and 3, obtains 505 video of an operating room captured by a plurality of image capture devices 110 positioned within the operating room. As further described above in conjunction with FIGS. 1 and 2, different image capture devices 110 have different positions within an operating room and are positioned to capture video of different locations within the operating room. Each image capture device 110 is configured to communicate with the surgical tracking server 120, which receives video of the operating room captured by each image captured device 110 positioned within the operating room. In various embodiments, the surgical tracking server 120 obtains an operating room identifier along with the video data, allowing the surgical tracking server 120 identify an operating room for which the video data is obtained 505. In some embodiments, the surgical tracking server 120 receives additional data describing the operating room from other sensors included in the operating room and communicating with the surgical tracking server 120. Examples of additional sensors included in the operating room from which the surgical tracking server 120 obtains 505 data include: audio capture devices, lidar sensors, wireless transceivers, example, radio frequency identification (RFID), temperature sensors, or any other suitable type of sensor.

The surgical tracking server 120 identifies 510 regions within frames of video from one or more image capture devices 110 including people or including other objects. In various embodiments, the surgical tracking server 120 applies one or more computer vision methods or models to the captured video data to identify the one or more regions within frames of video including objects. As used herein, "objects" includes people, equipment, instruments, or other items. For example, the one or more models perform two- or three-dimensional pose tracking, allowing the identification of regions of video data including a person or other object based on the pose tracking. In various embodiments, surgical tracking server 120 performs facial tracking (in two-dimensions or in three-dimensions), two-dimensional pose tracking, three-dimensional pose tracking, or any other suitable method to identify portions of a person's face or portions of the person's body within video from one or more image capture devices 110. The surgical tracking server 120 may apply one or more object detection methods to identify 510 objects in frame of the video, as further described above in conjunction with FIG. 3. To subsequently identify regions within a frame of video including an object or a person, the surgical tracking server 120 stores metadata in association with the video data identifying a frame including an identified object and coordinates within the frame specifying a bounding box identified as including a person or another object, so the bounding box specifies the region of the video including the person or the other object.

The surgical tracking server 120 determines 515 a state of one or more of the identified objects within the video by applying one or more trained models to the video and the identified objects. Example objects for which the surgical tracking server 120 determines 515 a state include: people in the operating room, tables in the operating room, surfaces in the operating room on which instruments are placed, cleaning equipment in the operating room, diagnostic equipment in the operating room, and any other suitable object included in the operating room. An example state of a person in the operating room indicates whether the person is scrubbed or unscrubbed; in another example, a state of a patient in the operating room indicates whether or not the patient is draped for surgery. An example state of a table in the operating room indicates whether the table is bare, is ready to be occupied by a patient, is occupied by a patient, or is unoccupied. An example state of an instrument surface indicates whether the instrument surface is prepared or is unprepared, while another example state of an instrument surface indicates whether the instrument surface is sterilized or is not sterilized. In various embodiments, surgical tracking server 120 trains models to determine states of various objects identified 510 in video based on states previously determined for an object or for a person from video, allowing the model to determine a state of an object or a person based on characteristics of video including the object or the person. For example, the surgical tracking server 120 applies a label indicating a state of an object or a person to characteristics of video (or other data from sensors) including the object or the person. From the labeled characteristics, the surgical tracking server 120 trains a model using any suitable training method or combination of training methods (e.g., back propagation to train the classification model if it is a neural network, curve fitting techniques if the classification model is a linear regression). The surgical tracking server 120 applies the trained model, or trained models, to characteristics of frames of video data, or to other sensor data, to determine 515 a state of the identified object.

From objects identified 510 within video of the operating room from the image capture devices 110 and states determined 515 for the identified objects, the surgical tracking server 120 determines 520 a phase of the operating room that represents a state of objects within the operating room. The surgical tracking server 120 maintains one or more sets of predefined phases for the operating room in various embodiments. For example, a set of predefined phases includes: a phase indicating the operating room is pre-operative, a phase indicating the operating room is in active surgery, a phase indicating the operating room is post-operative, a phase indicating the operating room is being cleaned, a phase indicating the operating room is idle, and a phase indicating the operating room is available. Different phases of the operating room may include one or more sub-phases to more particularly identify a status of objects within the operating room from captured video of the operating room, as well as data from one or more other types of sensors included in the operating room. For example, a phase indicating the operating room is pre-operative includes a set of sub-phases including a sub-phase indicating a patient is in the operating room, a sub-phase indicating the patient is on a surgical table, a sub-phase indicating the patient is receiving anesthesia, and a sub-phase indicating the patient is draped on the surgical table. In another example, a phase indicating the operating room is in active surgery includes a sub-phase indicating the patient has been opened for surgery, a sub-phase indicating surgical procedures are being performed on the patient, and a sub-phase indicating the patient has been closed. As another example, a phase indicating the operating room is post-operative includes a sub-phase indicating that the patient has been undraped, a sub-phase indicating the patient has woken from anesthesia, a sub-phase indicating the patient has been transferred from the surgical table to a gurney, and a sub-phase indicating the gurney is leaving the operating room. However, the surgical tracking server 120 may maintain any suitable phases, with phases including any suitable number of sub-phases, in various embodiments.

The surgical tracking server 120 accounts for information received from other sensors included in the operating room and coupled to the surgical tracking server 120 when determining 515 states of objects identified in the operating room. For example, the surgical tracking server 120 receives audio from the operating room captured by one or more audio capture devices within the operating room, and one or more models applied to the video from the operating room receive the captured audio as an input for determining 515 states of one or more objects. As another example, the surgical tracking server 120 receives signal strength information from one or more wireless transceivers (e.g., BLU-ETOOTH®) positioned within the operating room and determines locations of client devices within the operating room through triangulation or through any other suitable method; the determined locations of a client devices may be used as a proxy for locations of objects (e.g., a person) within the operating room and used as input for a trained model determining 515 a state of the object. In another example, an identifier of an object from one or more radio frequency identification (RFID) readers is received by the surgical tracking server 120 and used as an input to a model determining 515 a state of the object. Similarly, temperature or humidity from one or more temperature sensors is received as input to one or more trained models determining 515 states of one or more objects. Hence, the surgical tracking server 120 may use information from various sensors positioned within the operating room to determine 515 a state of one or more objects.

To determine 520 a phase from the obtained video, the surgical tracking server 120 compares positions of identified objects and people in frames and the states determined for the identified objects and people of the obtained video to stored images corresponding to different phases. In various embodiments, the surgical tracking server 120 applies one or more models that determine measures of similarity of frames of the obtained video data to stored images corresponding to phases by comparing positions of identified people and objects in frames of video data to positions of corresponding objects and people in images corresponding to phases and determines 520 a phase of the operating room based on the measures of similarity. An image corresponding to a phase identifies locations within the image of one or more objects in the image and a state corresponding to each of at least a set of identified object. As an example, an image corresponding to a phase identifies locations of different people within the image and identifies whether different people within the image are scrubbed or unscrubbed. In an additional example, an image corresponding to a phase identifies locations of different surfaces within the image and identifies whether different surfaces are sterile or unsterilized. For example, the surgical tracking server 120 determines 520 a phase of the operating room corresponding to a frame of obtained as a phase for which the frame has a maximum measure of similarity. In some embodiments, the surgical tracking server 120 maintains a set of rules associating different phases for the operating room. Each rule includes criteria identifying different locations within frames of video of objects having specific states for a phase, so the surgical tracking server 120 determines 520 a phase of the operating room corresponding to a rule having a maximum number of criteria satisfied by a frame of the obtained video. Alternatively, the surgical tracking server 120 includes a trained phase classification model that receives as inputs states determined for various identified objects and locations of the identified objects within a frame of video and determines a similarity of the combination of identified objects and people and the locations within the frame of the identified objects and people to images corresponding to different phases. The surgical tracking server 120 determines 520 a phase of the operating room as a phase corresponding to an image for which the model determines a maximum similarity. The surgical tracking server 120 may train the phase classification model to determine a likelihood of a combination of states of objects and their locations within a frame of video data matching a phase based on prior matching of combinations of states and locations of objects and people to phases. For example, the surgical tracking server 120 applies a label indicating a phase to a combination of states of objects and locations of the objects in images. From the labeled combinations of states of objects and locations of the objects, the surgical tracking server 120 trains the phase classification model using any suitable training method or combination of training methods (e.g., back propagation to train the classification model if it is a neural network, curve fitting techniques if the classification model is a linear regression). In some embodiments, the surgical tracking server 120 trains different phase classification models corresponding to different phases, maintaining separate phase classification models for different phases. Using a similar sub-phase classification model or rules corresponding to different sub-phases, the surgical tracking server 120 determines a sub-phase of the operating room from video of the operating room, or from data from other sensors within the operating room, when the phase determined 520 for the operating room includes one or more sub-phases. Hence, the surgical tracking server 120 determines both a phase and a sub-phase of the determined phase for the operating room when a phase includes one or more sub-phases.

When determining 520 a phase or a sub-phase of the operating room from video of the operating room, in various embodiments, the surgical tracking server 120 also determines a type of surgery for the operating room. To determine the type of surgery, the surgical tracking server 120 applies one or more surgery classification models that determine measures of similarity of frames of the obtained video data to stored images or videos corresponding to different types of surgery comparing positions of identified people and objects in frames and identified instruments within video to positions of corresponding objects, people, and instruments in images or video corresponding to different types of surgery and determines a type of surgery performed in the operating room based on the measures of similarity. An image or video corresponding to type of surgery identifies locations within the image or within a frame of one or more objects, as well as instruments or positions of instruments, within in the image and a state corresponding to each of at least a set of objects, people, and instruments. As an example, an image or a video corresponding to a type of surgery identifies locations of different people within the image or video, locations of different instruments within the image or video, types of instruments within the image or video. For example, the surgical tracking server 120 determines a type of surgery performed in the operating room corresponding to an image or video of a type of surgery for which the image or video has a maximum measure of similarity. The surgical tracking server 120 may train the surgery classification model to determine a likelihood of video corresponding to a type of surgery based on prior selection of a type of surgery from locations of objects, people, and instruments to the type of surgery. For example, the surgical tracking server 120 applies a label indicating a type of surgery to a combination of people, objects, and instruments in images or video. From the labeled images or video, the surgical tracking server 120 trains the surgery classification model using any suitable training method or combination of training methods (e.g., back propagation to train the classification model if it is a neural network, curve fitting techniques if the classification model is a linear regression). In some embodiments, the surgical tracking server 120 trains different surgery classification models corresponding to different types of surgery, maintaining separate surgery classification models for different types of surgeries. In some embodiments, the surgical tracking server 120 maintains a set of rules associating different types of surgery with the operating room. Each rule includes criteria identifying different locations within frames of video of objects, people, or instruments for a type of surgery, so the surgical tracking server 120 determines a type of surgery performed in the operating room corresponding to a rule having a maximum number of criteria satisfied by the obtained video. In some embodiments, the surgical tracking server 120 determines 520 a phase of the operating room, a sub-phase of the operating room, and a type of surgery for the operating room.

When determining a type of surgery performed in the operating room, the surgical tracking server 120 may also determine a step within the type of surgery from video of the operating room, as well as from other data captured by sensors within the operating room. To determine the step within the type of surgery, the surgical tracking server 120 applies one or more step prediction models, which are trained similarly to the phase classification model, or phase classification models, further described above. For a type of surgery, one or more step prediction models are trained to identify a step within the type of surgery from people, objects, and instruments within the video of the operating room. This allows the surgical tracking server 120 to classify use of the operating room at a high degree of specificity from video or other data from sensors in the operating room without a person in the operating room manually identifying the phase or the step in the type of surgery being performed.

In some embodiments, based on video from an image capture device 110 having a field of view including a door into the operating room, the surgical tracking server 120 determines a number of times the door has opened. In some embodiments, the surgical tracking server 120 identifies the door to the operating room has opened from changes in a position of the door in adjacent frames of video including the door. The surgical tracking server 120 may apply a trained model to frames of video including the door to determine when the door has been opened in some embodiments. In some embodiments, the surgical tracking server 120 determines a number of times the door has opened in different phases of the operating room, allowing the surgical tracking server 120 to maintain a record of a number of times the door has been opened when the operating room is in different phases. The surgical tracking server 120 may also track a number of people who enter and who exit the operating room based on video from the image capture device with a field of view including the door to the operating room. In some embodiments, the surgical tracking server 120 also identifies people who enter and who exit the operating room through facial recognition methods, pose detection methods, or through any other suitable methods, and stores information identifying a person in conjunction with a time when the person entered or exited the operating room. Additionally, the surgical tracking server 120 also identifies a role of a person entering or exiting the operating room based on movement of the person within the operating room or characteristics of the person when entering or exiting the operating room (e.g., whether the person was holding an instrument, an instrument the person was holding, a color of the person's clothing, etc.) and stores the identified role in conjunction with the information identifying the person.

Figure 6:
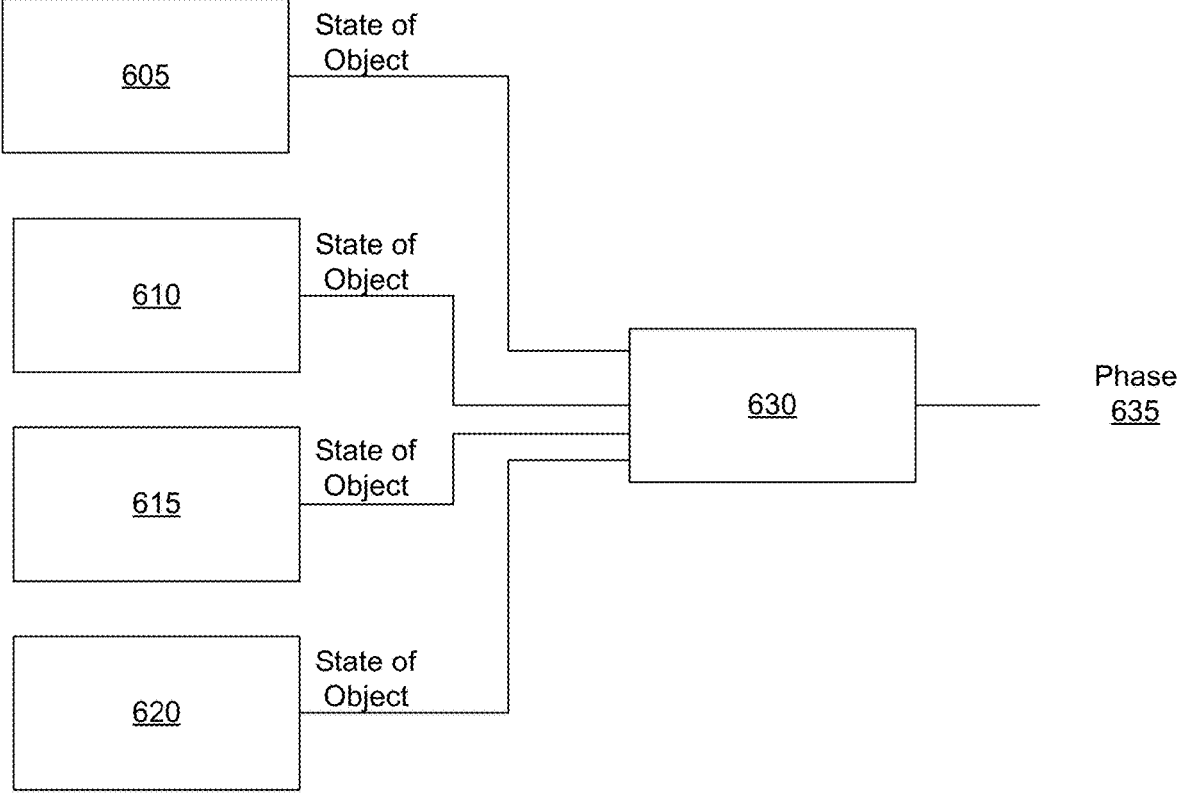
FIG. 6 shows a process flow diagram of the surgical tracking server determining a phase of an operating room, in accordance with an embodiment.

FIG. 6 shows a process flow diagram of one embodiment of the surgical tracking server 120 determining a phase of an operating room. In the example shown by FIG. 6, the surgical tracking server 120 applies multiple trained models 605, 610, 615, 620 to video of the operating room from one or more image capture devices 110 that determine a state of various objects identified in the video, as further described above in conjunction with FIG. 5. Hence, each model 605, 610, 615, 620 outputs a state of an object in the video of the operating room. The state of an object output by a model 605, 610, 615, 620 may identify a location of an object within a frame of video or a location of the object relative to one or more other identified objects in various embodiments. In various embodiments, the trained models 605, 610, 615, 620 receive information from other sensors in the operating room, such as audio capture device, wireless transceivers, temperature sensors, or other sensors, and leverage information from the other sensors along with the captured video of the operating room to determine a state of an object in the operating room.

States for various objects in the operating room determined by different trained models 605, 610, 615, 620 are input into a trained phase classification model 630, which determines a phase 635 of the operating room from the combination of states determined for various objects in the operating room. As described above in conjunction with FIG. 5, the phase classification model 630 may be a trained model or may be a set of rules that determine the phase 635 of the operating room from determined states of different objects in the operating room.

Referring back to FIG. 5, the surgical tracking server 120 stores 525 the determined phase in association with the operating room identifier and with a time when the phase was determined 520. From the determined phase, the surgical tracking server 120 or the analytics sever 150 generates 530 one or more metrics describing the operating room. For example, a metric determines an amount of time the operating room has been in the determined phase based on prior determinations of the phase of the operating room and time when the prior determinations of the phase of the operating room were performed. The surgical tracking server 120 or the analytics server 150 generates an interface identifying lengths of time that the operating room has been determined 520 to be in different phases in various embodiments. The interface may display information identifying different operating rooms and lengths of time each of the different operating rooms have been in different phases in some embodiments.

Another metric compares the determined amount of time the operating room has been in the determined phase to a desired duration for the determined phase. The desired duration may be specified by a user of the surgical tracking server or may be determined from historical average durations the operating room, or multiple operating rooms, have been in a particular phase. For example, the metric indicates whether the determined amount of time the operating room has been in the determined phase is greater than (or is less than) the desired duration for the determined phase. In another example, the metric indicates an amount of time between the determined amount of time the operating room has been in the determined phase and the desired duration. An additional or alternative metric determines a classification of the determined amount of the time the operating room has been within the determined phase, with different classifications corresponding to different amounts of time; for example, a classification corresponds to an average amount of time in the determined phase, an above average amount of time in the determined phase, and a below average amount of time in the determined phase. Different phases may have different amounts of time corresponding to different classifications in various embodiments. The interface generated by the surgical tracking server 120 or by the analytics server 120 may visually distinguish lengths of time an operating room has been in a phase that exceed a desired duration for the phase or that have a particular classification in some embodiments.

Figure 7:
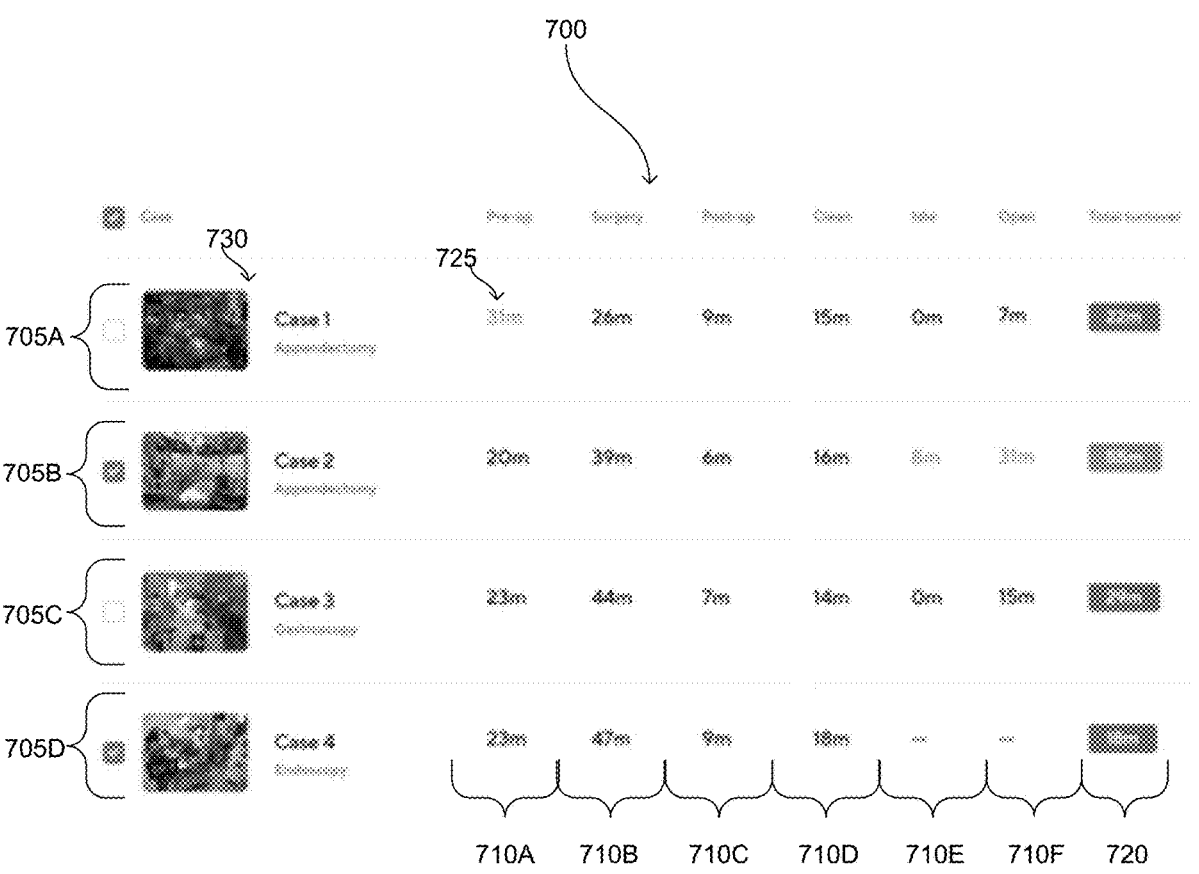
FIG. 7 shows an example interface identifying lengths of time different operating rooms have been in different phases, in accordance with an embodiment.

FIG. 7 shows an example interface 700 identifying lengths of time different operating rooms have been in different phases. In the example of FIG. 7, the interface 700 includes rows each corresponding to a different operating room 705A, 705B, 705C, 705D (also referred to individually and collectively using reference number 705), and columns corresponding to different phases 710A, 710B, 710C, 710D, 710E, 710F (also referred to individually and collectively using reference number 710). Hence, a combination of a row and a column specifies a length of time an operating room 705 corresponding to the row has been a state 710 corresponding to the column. Different rows include information identifying an operating room 705 corresponding to the row. Additionally, interface 700 displays an aggregate time 620 for each operating room 705 that is determined as a sum of the length of time the operating room 705 has been in each phase 710. Hence, the aggregate time 720 provides a cumulative length of time across phases determined for the operating room 705.

In the example of FIG. 7, the interface 700 also visually distinguishes lengths of time an operating room 705 has been determined to be in a phase 710 that equal or exceed a threshold, such as a desired duration of the phase 710. For example, in FIG. 7, the determined length of time that operating room 705A was in phase 710A exceeds a threshold duration, causing interface 700 to visually distinguish length of time 725 operating room 705 A was in phase 710A from display of other lengths of time operating rooms 705 were in other phases 710. While FIG. 7 shows an example here length of time 725 is displayed in a different color, in other embodiments, the interface 700 uses any suitable method to visually differentiate a length of time equaling or exceeding a threshold (e.g., displaying an icon in conjunction with the length of time, modifying a background color of the interface where the length of time is displayed, etc.). Such visual distinguishment of lengths of time in a phase 710 allow a user to more readily identify phases in which an operating room 705 was determined to be for greater than the threshold amount of time. Additionally, in the example of FIG. 7, the interface 700 displays video 730 captured by an image capture device 110 in an operating room 705 when the interface is displayed, allowing a user to ascertain a current status within the operating room 705 from the interface.

Figure 8:
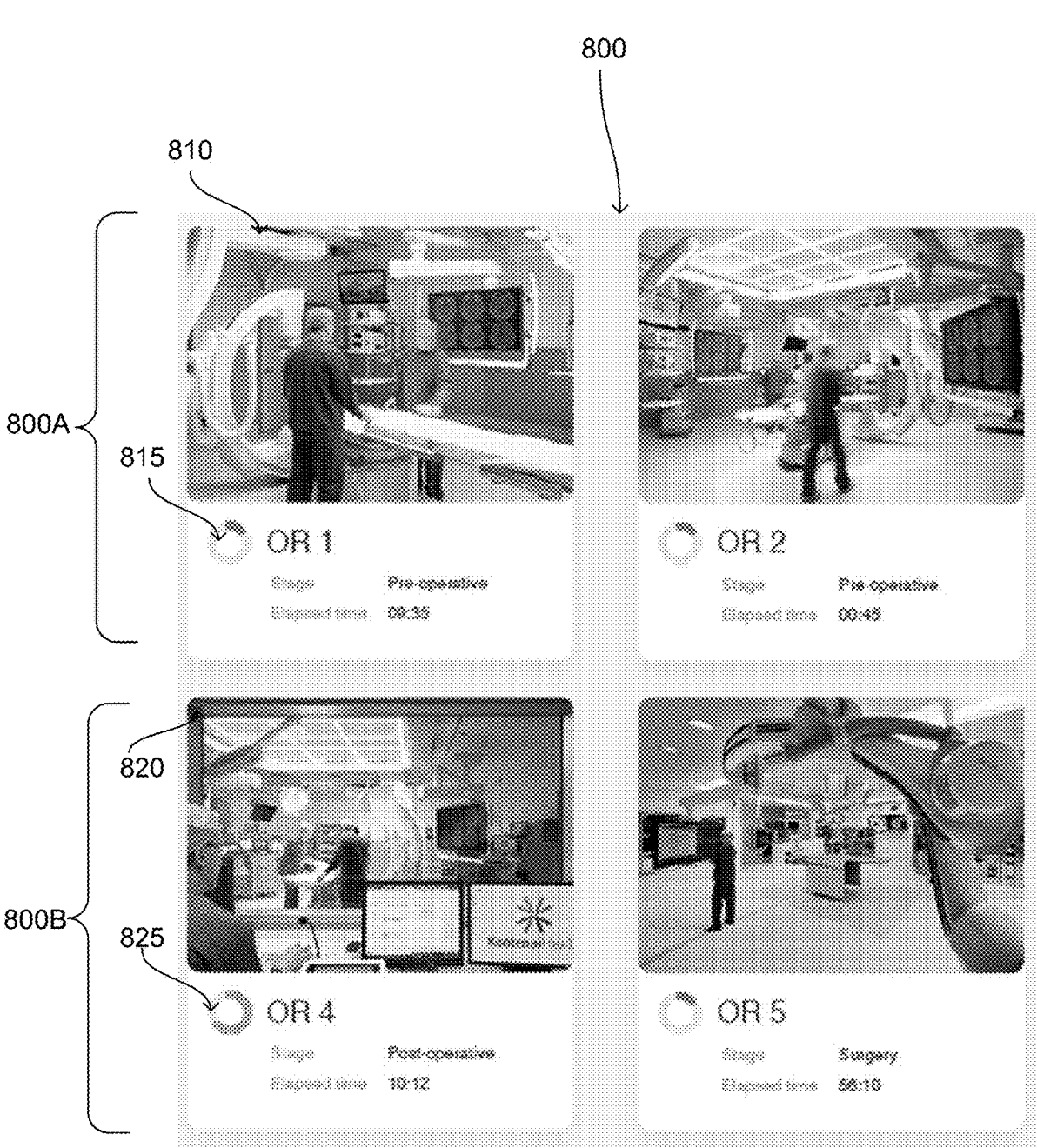
FIG. 8 is another example interface identifying phases determined for various operating rooms, in accordance with an embodiment.

FIG. 8 is another example interface 800 identifying phases determined for various operating rooms. In the example of FIG. 8, the interface 800 includes multiple regions 800A, 800B that each correspond to an operating room. Each region 800A, 800B includes information identifying an operating room to which a region 800A, 800B corresponds, such as a name or identifier of an operating room. Additionally, each region 800A, 800B includes video captured from the operating room. Hence, in the example of FIG. 8, region 800A includes video 810 captured within an operating room corresponding to region 800A, while region 800B includes video 820 captured within an operating room corresponding to region 800B.

Additionally, each region 800A, 800B identifies a currently determined phase for the operating room corresponding to the region 800A, 800B and a length of time the operating room has been in the currently determined phase. The interface also displays an indicator in each region 800A, 800B showing a relative completeness of the determined phase for a corresponding operating room. In the example shown by FIG. 8, the indicator has a different visual appearance depending on a difference between a length of time an operating room has been in a determined phase and a specified duration, such as a desired duration of the phase. For example, indicator 815 displayed in region 800A has a visual appearance indicating that the length of time the operating room corresponding to region 800A has been in the currently determined phase is greater than a threshold amount of time from a specified duration for the phase. In contrast, indicator 825 displayed in region 800B has a different visual appearance indicating that the length of time the operating room corresponding to region 800B is less than the threshold amount of time relative to the specified duration, allowing the visual appearance of an indictor to indicate how near the length of time an operating room has been in a phase is to a specified duration for the phase. In another embodiment, the visual appearance of an indicator displays whether the length of time an operating room has been in a currently determined phase is greater than or is less than a desired duration for the phase. Alternatively, the indicator has a different visual appearance for different phases.

Figure 9:
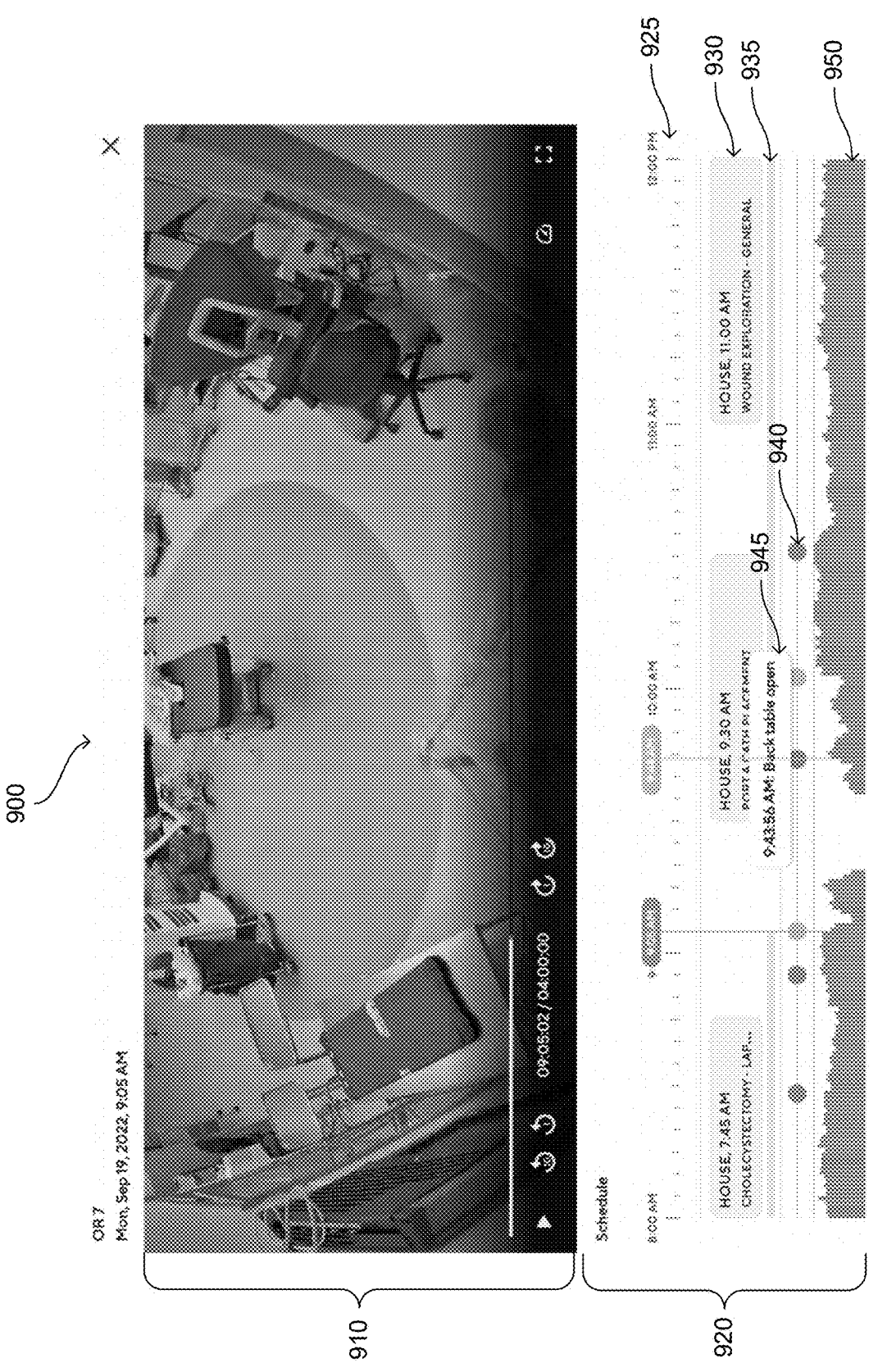
FIG. 9 illustrates another example interface 900 for a user to review recorded activity within an operating room, in accordance with an embodiment.

The interface generator 410 may generate a dashboard through which a user (e.g., a supervisor or operator) may monitor the status of one or more operating rooms. In some embodiments, the dashboard includes the interface illustrated in FIGS. 7 and/or 8. When the interface illustrated in FIG. 8 is displayed to a user, the user may select one of the regions 800A or 800B. In response to the selection, the interface generator 410 generates an interface for a user to review activity within a particular operating room during a preceding period of time. FIG. 9 illustrates another example interface 900 for a user to review recorded activity within an operating room. As illustrated in FIG. 9, the interface 900 includes a video playback region 910. A user may interact with selectable elements of the region 910 to play, rewind, or fast forward through video recorded by any of the image capture devices located within the operating room.

The interface 900 illustrated in FIG. 9 additionally includes an activity record 920, which characterizes activity within the operating room over a period of time using various graphic indicators. In addition to or as an alternative to the graphic indicators illustrated in FIG. 9, the interface generator 410 may generate the illustrated interface using any other suitable graphic indicators. In the illustrated embodiment, the activity within the operating room is organized according to a timeline 925. The activity record 920 further displays a schedule of procedures 930, describing what procedures are to be performed within the operating room, when they are scheduled to begin, and when they are scheduled to end. The schedule of procedures 930 may further display any other relevant details. Below the schedule of procedures 930, the activity record 920 displays a live forecast 935. For each procedure that has been completed or are currently ongoing, the live forecast 935 identifies when the procedure actually began and an updated expected end time for the procedure based on the actual start time. For procedures that have not yet begun, the live forecast 935 displays a projected start time and a projected end time based on delays and the end times of earlier scheduled procedures.

The interface generator 410 receives information generated by the surgical tracking server 120 regarding phases of the procedure and displays graphic markers 940 identifying when phases of each scheduled procedure began. A user may interact with the graphical interface to select a graphic marker, causing the interface generator 410 to display a label 945 describing the phase and a time when the phase began. The interface 900 may also display an occupancy record 950. The occupancy record 950 is a continuous record of the number of people within the operating room. As described above, the surgical tracking server 120 may determine number of people within an operating room based on the number of times the door to the room opens and closes and video recordings of the operating room.

Figure 10:
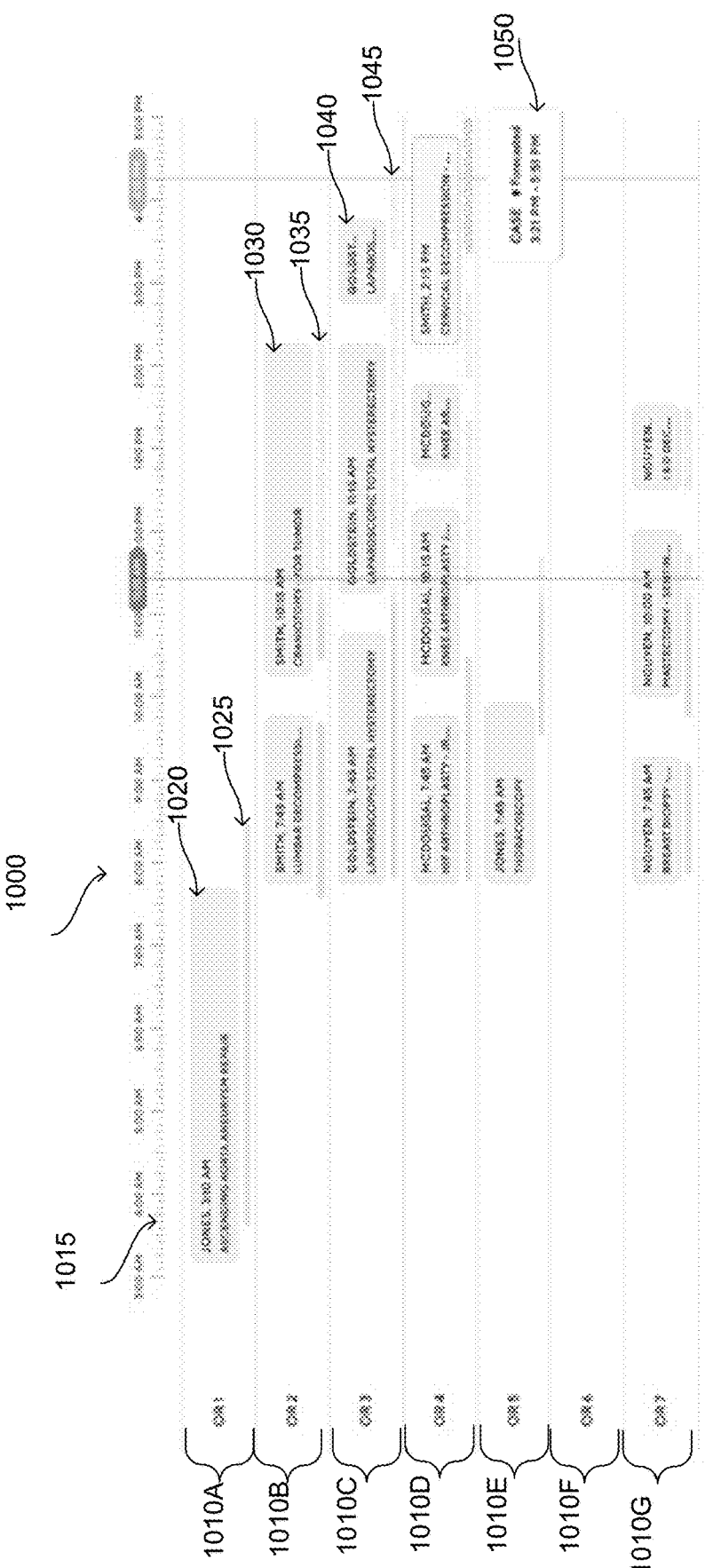
FIG. 10 illustrates another example interface for a user to monitor the schedule of multiple operating rooms simultaneously, in accordance with an embodiment.

While FIG. 9 illustrates an interface where a user may review the status of a particular operation room, FIG. 10 illustrates an interface where a user may manage the schedules of multiple operating rooms. FIG. 10 illustrates another example interface for a user to monitor the schedule of multiple operating rooms simultaneously. Similar to the interface 700 illustrated in FIG. 7, the interface 1000 illustrated in FIG. 10 includes rows each corresponding to a different operating room 1010A, 1010B, 1010C, 1010D, 1010E, 1010F, 1010G (also referred to individually and collectively using reference number 1010). Additionally, the interface 1000 displays a timeline 1015 vertically oriented above the columns 1010. Hence, a combination of a row 1010 and the timeline 1015 represents a schedule of procedures to be performed in a given operating room.

In the example of FIG. 10, the interface 1000 displays a scheduled procedure (e.g., the scheduled procedure 1020 and 1030) as an entry in the row extending from a scheduled start time on the timeline 1015 to a scheduled end time on the timeline 1015. Each scheduled procedure 1020 describes the scheduled start time, the procedure to be performed, the surgeon or supervisor for the procedure, and any other suitable information. In some circumstances, a procedure in an operation room may begin later than scheduled, for example because of personnel arriving late or a prior procedure ending later than scheduled. In other circumstances, a procedure may take longer than anticipated, for example due to complications during the procedure. Additionally, upon selection of a scheduled procedure by a user, the interface generator 410 generates a display 1050 verbally describing the start and end time graphically displayed on the interface 1000.

For each scheduled procedure, the interface 1000 illustrates a live forecast (e.g., the live forecast 1025 and 1035) consistent with the description of the live forecast 935 illustrated in FIG. 9. For procedures that have been completed, such as the procedure 1020, the alignment of the live forecast (e.g., the live forecast 1025) with the timeline 1015 indicates the actual start time of the procedure and the actual end time of the procedure. For procedures that are ongoing or have not yet been completed, the live forecast (e.g., the live forecast 1035) identifies the time when the procedure actually started and a projected end time. The analytics module 405 dynamically updates the projected end time based on the delay between the scheduled start time and the actual start time. The analytics module 405 additionally dynamically updates the projected end time based on the duration of time that the operating room spends in particular phases. For procedures that have not yet begun, such as the procedure 1040, the live forecast 1045 identifies a projected start time and a projected end time. The analytics module 405 dynamically updates such live forecasts using the techniques discussed above.

Additionally, the interface generator 410 dynamically displays the live forecasts to distinguish between completed procedures or completed phases of procedures. For example, the live forecast 1025 for a completed procedure is displayed in a visually distinct manner from the live forecast 1045. For the ongoing procedure 1030, the interface generator 410 visually displays the completed portion of the live forecast 1030 in a visually similar manner to the live forecast 1025 and the uncompleted portion in a visually similar manner to the live forecast 1045.

Referring back to FIG. 5, based on the determined phase or one or more metrics for the operating room, the analytics server 140 (or the surgical tracking server 120) transmits one or more notifications to users. For example, a phase is stored in association with a user, and the analytics server 140 (or the surgical tracking server 120) transmits a notification to the user in response to the determined phase for the operating room matching the phase stored in association with the user. A user may specify different phases for different operating rooms, so the user receives a notification from the analytics server 140 (or the surgical tracking server 120) when a specific operating room is determined to be in a phase specified by the user. The notification may be a push notification, a text message, a multimedia message, an email, or have any other suitable format. A user may specify a format in which the notification is transmitted in some embodiments. For example, the notification is transmitted as a text message or is configured to be displayed by an application associated with the surgical tracking server 120, or with the analytics sever 140, that executes on a client device of the user.

In another embodiment, the surgical tracking server 120 or the analytics server 140 transmits a notification to a user associated with a phase of the operating room in response to determining a length of time the operating room has been in an additional phase that is prior to the phase associated with the user is within a threshold amount of time from a specified duration. For example, the specified duration is a predicted duration of the additional phase that the surgical tracking server 120 determines from prior durations the operating room, or other operating rooms, have been in the additional phase, allowing the surgical tracking server 120 to proactively notify a user associated with a subsequent phase when the operating room is within the threshold amount of time of a predicted completion time of the phase. Such a notification decreases a time for users associated with a subsequent phase to be prepared or to reach the operating room based on how close the operating room is to reaching a predicted completion time of a current phase.

In some embodiments, the analytics server 140 or the surgical tracking server 120 transmits a notification, or other data or messages, to one or more displays in the operating room based on the determined phase of the operating room or one or more metrics determined for the operating room. For example, the analytics server 140 or the surgical tracking server 120 transmits a length of time the operating room has been determined to be in a currently determined phase to one or more displays in the operating room, allowing people in the operating room to determine how long the operating room has been in a phase. The length of time may be continuously updated so the display tracks the length of time the operating room has been in the currently determined phase. In some embodiments, the length of time displayed in the operating room is relative to desired time for the phase, or a display in the operating room displays the desired time for the phase in conjunction with the length of time the operating room has been in the currently determined phase.

The analytics server 140 or the surgical tracking server 120 transmits different information to different displays in the operating room in some embodiments. For example, the analytics server 140 or the surgical tracking server 120 transmits a count of a number of times a door to the operating room has been opened to a display proximate to the door to the operating room. In some embodiments, the analytics server 140 or the surgical tracking server 120 transmits a message for presentation by the display proximate to the door to warn people not to open the door. The message to warn people not to open the door to the operating room is transmitted in response to the surgical tracking server 120 determining a specific sub-phase for the operating room, allowing the analytics server 140 or the surgical tracking server 120 to reduce a likelihood of people opening the door to the operating room during a particular portion of a procedure performed in the operating room. The surgical tracking server 120 or the analytics server 140 maintains associations between one or more sub-phases of the operating room and the message transmitted to a display in the operating room, such as a display proximate to the door to the operating room, allowing the analytics server 140 or the surgical tracking server 120 to transmit a message to a display in the operating room in response to the surgical tracking server 120 determining 520 a specific sub-phase for the operating room. Different messages may be associated with different sub-phases in various embodiments; similarly, different messages may also be associated with different displays in the operating room, allowing different displays in the operating room to display different information to people within the operating room. As an example, a display proximate to a particular piece of equipment in the operating room displays instructions for operating the particular piece of equipment in response to the surgical tracking server 120 determining 520 a specific sub-phase for the operating room. Hence, the analytics server 140 or the surgical tracking server 120 may display different information in the operating room depending on a phase or a sub-phase determined 520 for the operating room.

Additionally, the surgical tracking server 120 or the analytics server 140 transmits a notification to one or more specific users in response to identifying a specific step of a type of surgery from video of the operating room. The specific users may be users having a specific type identified in their corresponding user profiles. As another example, the surgical tracking server 120, or the analytics server 140, associates different users with different steps of a type of surgery, and transmits a notification to a user associated with a step of a type of surgery in response to determining the step of the type of surgery is being performed in the operating room from obtained data. As another example, the surgical tracking server 120 or the analytics server 140 transmits a notification to a user associated with a step of a type of surgery in response to determining the operating room has been in another step of the type of surgery preceding the step of the type of surgery for at least a threshold amount of time. In another embodiment, the surgical tracking server 120 or the analytics server 140 transmits a notification to a user associated with a step of the type of surgery determined for the operating room in response to determining a length of time the operating room has been in an additional step that is prior to the step of the type of surgery associated with the user is within a threshold amount of time from a specified duration. For example, the specified duration is a predicted duration of the additional step of the type of surgery that the surgical tracking server 120 determines from prior completions of the type of surgery, allowing the surgical tracking server 120 to proactively notify a user associated with a subsequent step when the operating room is within the threshold amount of time of a predicted completion time of the current step. This allows the surgical tracking server 120 or the analytics server 140 to automatically transmit a notification to a user for participation in a step of a type of surgery, reducing a time for the user to arrive at the operating room for the step of the type of surgery. Such proactive notification to users (e.g., imaging technicians, pathologists) involved in specific steps of a type of surgery allows those users to be more readily accessible for participating in a corresponding specific step of the type of surgery.

As another example, the surgical tracking server 120 or the analytics server 140 transmits a notification to one or more specific users indicating surgery in the operating room is nearly completed in response to the surgical tracking server 120 identifying one or more specific actions when determining 520 the phase of the operating room. The specific users may be users having a specific type. In various embodiments, in response to the surgical tracking server 120 determining a patient is being closed when determining 520 the phase of the operating room, the surgical tracking sever or the analytics server 120 transmits a notification to one or more specific users that indicates the surgery is nearly complete. This allows the users receiving the notification to account for a nearness to completion of a surgery in the operating room when determining an availability of the operating room for an additional surgery, allowing more efficient scheduling of surgeries in operating rooms. In some embodiments, an interface displayed to one or more specific users (e.g., users authorized to schedule surgeries) displays a visual indication in response to o the surgical tracking server 120 determining a patient is being closed when determining 520 the phase of the operating room, simplifying identification of an operating room likely to have near-term availability.

Additional Configuration Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
obtaining, at a surgical tracking server, video of an operating room from a plurality of image capture devices positioned at different locations within the operating room;
identifying objects within frames of the video obtained from one or more of the image capture devices by application of one or more computer vision models by the surgical tracking server;
determining a state of each identified object by the surgical tracking server applying one or more models to characteristics of the video including the identified objects;
determining a phase of the operating room from a set of predetermined phases by application of one or more phase classification models to the determined states for each identified object, wherein each phase classification model is trained to:
access a set of rules, each rule corresponding to a phase of the set of predetermined phases and criteria identifying locations of objects within frames of video and a specific state of each object; and
for a frame of the obtained video, determine the phase of the predetermined set corresponding to a rule for which the frame satisfies a maximum number of criteria; and storing the determined phase and a time when the determined phase was determined in association with the operating room.

2. The method of claim 1, wherein determining the phase of the operating room from the set of predetermined phases comprises:
comparing positions of and states of the identified objects within a frame of the video obtained to stored images corresponding to different phases of the set of predetermined phases.

3. The method of claim 2, wherein comparing positions of and states of the identified objects within the frame of the video to stored images corresponding to different phases of the set of predetermined phases comprises:
applying one or more trained models to the frame of the video, a trained model determining a measure of similarity of the frame to stored images corresponding to a phase of the predetermined set; and
determining the phase of the operating room as a phase of the predetermined set for which the frame of the video obtained from the image capture device has a maximum similarity.

4. The method of claim 1, wherein the set of predetermined phases comprises: a phase indicating the operating room is pre-operative, a phase indicating the operating room is in active surgery, a phase indicating the operating room is post-operative, a phase indicating the operating room is being cleaned, a phase indicating the operating room is idle, and a phase indicating the operating room is available.

5. The method of claim 1, further comprising:
determining a sub-phase of the determined phase based on the determined states for each identified person or object; and
storing the determined sub-phase of the determined phase in association with the operating room.

6. The method of claim 5, wherein a phase indicating the operating room is pre-operative includes a set of sub-phases comprising: a sub-phase indicating a patient is in the operating room, a sub-phase indicating the patient is on a surgical table, a sub-phase indicating the patient is receiving anesthesia, and a sub-phase indicating the patient is draped on the surgical table.

7. The method of claim 5, wherein a phase in indicating the operating room is in active surgery includes a set of sub-phases comprising: a sub-phase indicating a patient has been opened for surgery, a sub-phase indicating surgical procedures are being performed on the patient, and a sub-phase indicating the patient has been closed.

8. The method of claim 5, wherein a phase indicating the operating room is post-operative includes: a sub-phase indicating that a patient has been undraped, a sub-phase indicating the patient has woken from anesthesia, a sub-phase indicating the patient has been transferred from a surgical table to a gurney, and a sub-phase indicating the gurney is leaving the operating room.

9. The method of claim 1, further comprising:
determining type of surgery for the operating room by applying a trained surgical classification model to the identified objects in the video; and
storing the type of surgery in association with the operating room.

10. The method of claim 1, further comprising:
determining an amount of time the operating room has been in the determined phase from the time and a time when the determined phase was determined and times when prior phases for the operating room were determined.

11. The method of claim 10, further comprising:

transmitting an interface including information identifying the operating room, video obtained from at least one or more of the plurality of image capture devices, the determined phase, and the amount of time the operating room has been in the determined phase to a client device of a user for display.

12. The method of claim 11, further comprising:

comparing the amount of time the operating room has been in the determined phase to a desired duration for the determined phase; and in response to the comparing determining the operating room has been in the determined phase longer than the desired duration, displaying an indication the amount of time in the operating room has been in the determined phase exceeds the desired duration in the interface.

13. The method of claim 1, further comprising:

determining a number of times a door to the operating room has been opened from video of the door captured by an image capture device having a field of view including the door to the operating room.

14. A system comprising:

a plurality of image capture devices positioned within an operating room and each capturing video of the operating room, each image captured device having a different location within the operating room; and a surgical tracking server coupled to the plurality of image capture devices, the surgical tracking server including a non-transitory computer readable storage medium having instructions encoded thereon that, when executed by a processor, cause the processor to:

identify objects within frames of the video obtained from one or more of the plurality of image capture devices by application of one or more computer vision models by the surgical tracking server;

determine a state of each identified object by the surgical tracking server applying one or more models to characteristics of the video including the identified objects;

determine a phase of the operating room from a set of predetermined phases by application of one or more phase classification models to the determined states for each identified object, wherein each phase classification model is trained to:

access a set of rules, each rule corresponding to a phase of the set of predetermined phases and criteria identifying locations of objects within frames of video and a specific state of each object; and for a frame of the obtained video, determine the phase of the predetermined set corresponding to a rule for which the frame satisfies a maximum number of criteria; and store the determined phase and a time when the determined phase was determined in association with the operating room.

15. The system of claim 14, wherein an image capture device has a field of view including a door to the operating room.

16. The system of claim 14, wherein the non-transitory computer readable storage medium of the surgical tracking server further has instructions encoded thereon that, when executed by the processor, cause the processor to:

determine a number of times a door to the operating room has been opened from video of the door captured by an image capture device having a field of view including the door to the operating room.

17. The system of claim 14, wherein the plurality of image capture devices includes two or more image capture devices having fields of view including a surgical table in the operating room.

18. The system of claim 17, wherein the fields of view of the plurality of image capture devices are non-overlapping.

19. The system of claim 17, wherein the plurality of image capture devices includes two or more additional cameras having fields of view including an instrument table in the operating room.

20. The system of claim 14, wherein the instructions for determining the phase of the operating room from the set of predetermined phases further cause the processor to:

compare positions of and states of the identified objects within a frame of the video obtained from the image capture device to stored images corresponding to different phases of the set of predetermined phases.

21. The system of claim 20, wherein the instructions for comparing positions of and states of the identified objects within the frame of the video obtained from the image capture device to stored images corresponding to different phases of the set of predetermined phases further cause the processor to:

apply one or more trained models to the frame of the video obtained from the image capture device, a trained model determining a measure of similarity of the frame to stored images corresponding to a phase of the predetermined set; and determine the phase of the operating room as a phase of the predetermined set for which the frame of the video obtained from the image capture device has a maximum similarity.

22. The system of claim 14, wherein the set of predetermined phases comprises: a phase indicating the operating room is pre-operative, a phase indicating the operating room is in active surgery, a phase indicating the operating room is post-operative, a phase indicating the operating room is being cleaned, a phase indicating the operating room is idle, and a phase indicating the operating room is available.

23. The system of claim 14, wherein the non-transitory computer readable storage medium of the surgical tracking server further has instructions encoded thereon that, when executed by the processor, cause the processor to:

determine a sub-phase of the determined phase based on the determined states for each identified object; and store the determined sub-phase of the determined phase in association with the operating room.

24. The system of claim 23, wherein a phase indicating the operating room is pre-operative includes a set of sub-phases comprising: a sub-phase indicating a patient is in the operating room, a sub-phase indicating the patient is on a surgical table, a sub-phase indicating the patient is receiving anesthesia, and a sub-phase indicating the patient is draped on the surgical table.

25. The system of claim 23, wherein a phase in indicating the operating room is in active surgery includes a set of sub-phases comprising: a sub-phase indicating a patient has been opened for surgery, a sub-phase indicating surgical procedures are being performed on the patient, and a sub-phase indicating the patient has been closed.

26. The system of claim 23, wherein a phase indicating the operating room is post-operative includes: a sub-phase indicating that a patient has been undraped, a sub-phase indicating the patient has woken from anesthesia, a sub-phase indicating the patient has been transferred from a surgical table to a gurney, and a sub-phase indicating the gurney is leaving the operating room.

27. The system of claim 14, wherein the non-transitory computer readable storage medium of the surgical tracking server further has instructions encoded thereon that, when executed by the processor, cause the processor to:

determine type of surgery for the operating room by applying a trained surgery classification model to identified objects in the videos identified in the video from the image capture device; and store the type of surgery in association with the operating room.

28. The system of claim 14, further comprising:

an analytics server configured to receive the determined phase and video obtained from the plurality of image capture devices from the surgical tracking server, the analytics server comprising a processor and a non-transitory computer readable storage medium having instructions encoded thereon that, when executed by the processor, cause the processor to;

determine an amount of time the operating room has been in the determined phase from the time and a time when the determined phase was determined and times when prior phases for the operating room were determined; and transmit an interface including information identifying the operating room, video obtained from at least one or the image capture devices, the determined phase, and the amount of time the operating room has been in the determined phase to a client device of a user for display.

29. The system of claim 28, wherein the non-transitory computer readable storage medium of the analytics server further has instructions encoded thereon that, when executed by the processor of the analytics server, cause the processor of the analytics server to:

compare the amount of time the operating room has been in the determined phase to a desired duration for the determined phase; and in response to the comparing determining the operating room has been in the determined phase longer than the desired duration, display an indication the amount of time in the operating room has been in the determined phase exceeds the desired duration in the interface.

30. The system of claim 28, further comprising:

one or more displays included in the operating room, a display configured to display the amount of time the operating room has been in the determined phase.

31. The system of claim 14, further comprising:

one or more audio capture devices configured to capture audio within the operating room, wherein the non-transitory computer readable storage medium of the surgical tracking server has instructions encoded ehtereon that, when executed by the processor, cause the processor to:

receive captured audio from the one or more audio capture device and to determine the state of an identified object by applying a trained model to characteristics of the video including the identified object and to the captured audio.

32. The system of claim 14, further comprising:

one or more wireless transceivers located in the operating room and configured to capture signal strength information from client devices within the operating room wherein the non-transitory computer readable storage medium of the surgical tracking server has instructions encoded thereon that, when executed by the processor, cause the processor to:

determine a location of a client device within the operating room from the signal strength information captured by the one or more wireless transceivers; and determine the state of an identified object by applying a trained model to characteristics of the video including the identified object and to a location within the operating room of the location of the client device within the operating room.

33. The system of claim 14, further comprising:

one or more radio frequency identification readers located in the operating room and configured to transmit information identifying one or more objects from radio frequency tags applied to an object to the surgical tracking server, wherein the non-transitory computer readable storage medium of the surgical tracking server has instructions encoded thereon that, when executed by the processor, cause the processor to:

determine the state of an identified object by applying a trained model to characteristics of the video including the identified object and to the information identifying the identified object from the one or more radio frequency identification readers.

34. The system of claim 14, further comprising:

one or more temperature sensors located in the operating room and configured to transmit a temperature of the operating room to the surgical tracking server, wherein the non-transitory computer readable storage medium of the surgical tracking server has instructions encoded thereon that, when executed by the processor, cause the processor to:

determine the state of an identified object by applying a trained model to characteristics of the video including the identified object and to the temperature of the operating room.

* * * * *